(12) United States Patent
Uno et al.

(10) Patent No.: US 11,475,237 B2
(45) Date of Patent: Oct. 18, 2022

(54) IMAGE ANALYSIS DEVICE AND IMAGE ANALYSIS SYSTEM

(71) Applicant: AWL, Inc., Chiyoda-ku (JP)

(72) Inventors: Reo Uno, Chiyoda-ku (JP); Yasuhiro Tsuchida, Chiyoda-ku (JP)

(73) Assignee: AWL, Inc., Chiyoda-ku (JP)

( * ) Notice: Subject to any disclaimer, the term of this patent is extended or adjusted under 35 U.S.C. 154(b) by 260 days.

(21) Appl. No.: 16/857,334

(22) Filed: Apr. 24, 2020

(65) Prior Publication Data

US 2020/0342258 A1 Oct. 29, 2020

(30) Foreign Application Priority Data

Apr. 26, 2019 (JP) .............................. JP2019-085621

(51) Int. Cl.
*G06K 9/62* (2022.01)
*G06N 3/08* (2006.01)
*G06V 10/94* (2022.01)

(52) U.S. Cl.
CPC ......... *G06K 9/6227* (2013.01); *G06K 9/6256* (2013.01); *G06N 3/08* (2013.01); *G06V 10/94* (2022.01); *G06V 2201/07* (2022.01)

(58) Field of Classification Search
CPC .... G06K 9/6227; G06K 9/6256; G06K 9/627; G06N 3/08; G06N 3/0454; G06N 3/04; G06N 5/04; G06V 10/94; G06V 2201/07; G06V 10/82; G06V 10/96; G06V 20/52; G06V 40/16; G06V 20/20; G06V 40/166; G06V 40/172; G06V 10/10
See application file for complete search history.

(56) References Cited

U.S. PATENT DOCUMENTS

| | | | | |
|---|---|---|---|---|
| 11,203,361 | B2* | 12/2021 | Je | B60W 60/001 |
| 2018/0349709 | A1* | 12/2018 | Shinohara | H04N 7/181 |
| 2019/0171905 | A1* | 6/2019 | Ye | G06V 10/757 |
| 2019/0377959 | A1* | 12/2019 | Marano | B64F 1/305 |
| 2020/0364509 | A1* | 11/2020 | Weinzaepfel | G06N 3/0454 |

FOREIGN PATENT DOCUMENTS

JP 2017-224925 A 12/2017

* cited by examiner

*Primary Examiner* — Wesley J Tucker
(74) *Attorney, Agent, or Firm* — Oblon, McClelland, Maier & Neustadt, L.L.P.

(57) ABSTRACT

An image analysis device has: an image analysis circuitry to analyze images input from each of cameras using instances of an image analysis program including a learned neural network model for object detection and learned neural network models for object recognition; inference processors to perform inference processes in the learned neural network model for object detection and each learned neural network model for object recognition; and a processor assignment circuitry to assign, from the inference processors, inference processors to be used for the inference process in the learned neural network model for object detection and the inference process in each learned neural network model for object recognition, based on inference time and frequency of use required for the inference process in each of the learned neural network models for object detection and object recognition included in each instance of the image analysis program.

9 Claims, 12 Drawing Sheets

IMAGE ANALYSIS DEVICE AND IMAGE ANALYSIS SYSTEM

CROSS-REFERENCE TO RELATED APPLICATION

This application is based on and claims the benefit of priority of the prior Japanese Patent Application No. 2019-085621, filed on Apr. 26, 2019, the entire contents of which are incorporated herein by reference.

BACKGROUND OF THE INVENTION

1. Field of the Invention

The present invention relates to an image analysis device and an image analysis system.

2. Description of the Related Art

Conventionally, there is known a device or system which uses a neural network for object detection to detect objects such as a person captured in a frame image taken by a camera such as a surveillance camera, and also uses a neural network for object recognition to recognize the detected objects (for example, refer to Japanese Laid-open Patent Publication 2017-224925). Here, it is to be noted that in a device or system using neural networks to detect and recognize objects as described above (hereafter referred to as "object detection and recognition device"), both object detection and object recognition are processes requiring significant computer resources. Further, the time required to recognize all objects in one frame image depends on the number of objects contained (detected) in the frame.

Therefore, if many objects are detected in a frame image, a long time is required to recognize the objects, and thus the problem of so-called frame drops occurs such that it is not possible to recognize objects in frame images which are input for a while after a frame image with many objects (recognition failure occurs). As an existing method to handle the above problem, there is a method which divides the thread for object detection process and the thread for object recognition process so as to enable parallel processing, and which assigns a number of inference processors (processors for inference) such as GPUs (Graphics Processing Units) to the inference process of the neural network for object recognition so as to increase the speed of the object recognition process.

However, although the existing method described above can handle the case where the object detection and recognition device or system performs the object detection and the object recognition for input images from one camera because the kind of object detection and object recognition to be performed for the input images is fixed, the method described above cannot handle the case where it performs the object detection and the object recognition for input images from a plurality of cameras because it is rare that the kinds of objection detections and objection recognitions to be performed for the input images from the respective cameras are all the same. More specifically, if the object detection and recognition device or system performs the object detection and the object recognition for input images from a plurality of cameras, and if the kind of object recognition for input images from one camera is different from the kind of object recognition for input images from another camera, the use of a number of GPUs assigned to (inference processes of) neural networks corresponding to all kinds of object recognitions increases the cost too much. Thus, considering the processing time (inference time) and the frequency of use of each of neural network models corresponding to the plurality of kinds of object recognitions and object detections, an inference processor suitable for the inference process of each of these neural network models is required to be assigned to the each neural network model.

BRIEF SUMMARY OF THE INVENTION

An object of the present invention is to solve the problems described above, and to provide an image analysis device and an image analysis system in which even if the kind of object recognition for input images from one camera among a plurality of cameras is different from the kind of object recognition for input images from another camera, an inference processor suitable for an inference process of each of neural network models corresponding to each of these object recognition and object detection can be assigned to the each neural network model.

According to a first aspect of the present invention, this object is achieved by an image analysis device to be connected to a plurality of cameras, comprising: an image analysis circuitry configured to analyze images input from each of the plurality of cameras by using respective instances of at least one image analysis program including a learned neural network model for object detection configured to detect objects captured in the images input from the each of the plurality of cameras, and also including at least one kind of learned neural network model for object recognition configured to recognize the objects detected by the learned neural network model for object detection; a plurality of inference processors configured to perform inference processes in the learned neural network model for object detection and the at least one kind of learned neural network model for object recognition; and a processor assignment circuitry configured to assign, from the plurality of inference processors, inference processors to be used for the inference process in the learned neural network model for object detection and the inference process in each of the at least one kind of learned neural network model for object recognition, based on an inference time and a frequency of use required for the inference process in each of the learned neural network model for object detection and the at least one kind of learned neural network model for object recognition that are included in each of the instances of the image analysis program.

According to this configuration, it is possible that even if the kind of object recognition (using a learned neural network model for object recognition) for input images from one camera among a plurality of cameras is different from the kind of object recognition for input images from another camera, an inference processor suitable for an inference process of each of the neural network models corresponding to each of these object recognition and object detection can be assigned to the each neural network model, considering the processing time (inference time) and the frequency of use of each of the neural network models corresponding to the plurality of kinds of object recognitions and object detections. This makes it possible to perform efficient object recognition for input images from each of the plurality of cameras by using a limited number of inference processors.

It can be configured that the processor assignment circuitry estimates a required number of inference processors for the inference process in each of the at least one kind of learned neural network model for object recognition, based on the inference time required for the inference process in each of the at least one kind of learned neural network model for object recognition, and on the frequency of use of each of the at least one kind of learned neural network model for object recognition.

It can also be configured that the processor assignment circuitry estimates a required number of inference processors for the inference process in each of the at least one kind of learned neural network model for object recognition, based on the inference time required for the inference process in each of the at least one kind of learned neural network model for object recognition, and on the frequency of use of each of the at least one kind of learned neural network model for object recognition, and also on a target number of frames subjected to the inference process by each of the at least one kind of learned neural network model for object recognition within a certain time.

It can also be configured that the processor assignment circuitry estimates a required number of inference processors for the inference process in the learned neural network model for object detection, based on the inference time required for the inference process in the learned neural network model for object detection, and on the number of cameras to capture images to be input as targets for the object detection using the learned neural network model for object detection.

It can also be configured that the processor assignment circuitry estimates a required number of inference processors for the inference process in the learned neural network model for object detection, based on the inference time required for the inference process in the learned neural network model for object detection, and on the number of cameras to capture images to be input as targets for the object detection using the learned neural network for object detection, and also on a target number of frames subjected to the inference process by the learned neural network model for object detection within a certain time.

It can also be configured that the image analysis device further comprises a storage configured to store images input from the each of the plurality of cameras, wherein if at a certain time the processor assignment circuitry is unable to assign the inference processor to the learned neural network model for object detection or the learned neural network model for object recognition for its inference process, and if thereafter the processor assignment circuitry becomes able to assign the inference processor to such learned neural network model for object detection or such learned neural network model for object recognition for its inference process, then the image analysis device thereafter performs an inference process in such learned neural network model for object detection or such learned neural network model for object recognition in non-real time based on past images stored in the storage.

It can also be configured that the plurality of cameras to be connected to the image analysis device are classified into a plurality of camera groups, wherein the at least one image analysis program comprises a plurality of image analysis programs, and wherein the plurality of image analysis programs respectively corresponding to the plurality of camera groups comprise mutually different combinations of the learned neural network model for object detection and the learned neural network model for object recognition.

According to a second aspect of the present invention, the above object is achieved by an image analysis system comprising: a plurality of image analysis devices; a plurality of cameras connected to each of the image analysis devices; and a management server configured to perform management of the cameras and the image analysis devices, which includes installing image analysis programs to the image analysis devices, wherein each of the image analysis devices comprises: an image analysis circuitry configured to analyze images input from each of the plurality of cameras by using respective instances of the image analysis programs including a learned neural network model for object detection configured to detect objects captured in the images input from the each of the plurality of cameras, and also including at least one kind of learned neural network model for object recognition configured to recognize the objects detected by the learned neural network model for object detection; a plurality of inference processors configured to perform inference processes in the learned neural network model for object detection and the at least one kind of learned neural network model for object recognition; and a processor assignment circuitry configured to assign, from the plurality of inference processors, inference processors to be used for the inference process in the learned neural network model for object detection and the inference process in each of the at least one kind of learned neural network model for object recognition, based on an inference time and a frequency of use required for the inference process in each of the learned neural network model for object detection and the at least one kind of learned neural network model for object recognition that are included in each of the instances of the image analysis program.

According to this configuration, it is possible to obtain an effect, in addition to the effect described above, that the management server is configured and used to perform management of the image analysis devices, which includes installing the image analysis programs to the image analysis devices.

It is preferred that the plurality of cameras connected to the image analysis devices are classified into a plurality of camera groups, wherein the image analysis programs respectively corresponding to the plurality of camera groups comprise mutually different combinations of the learned neural network model for object detection and the learned neural network model for object recognition.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that the drawings are shown for the purpose of illustrating the technical concepts of the present invention or embodiments thereof, wherein.

DETAILED DESCRIPTION OF THE INVENTION

Figure 1:
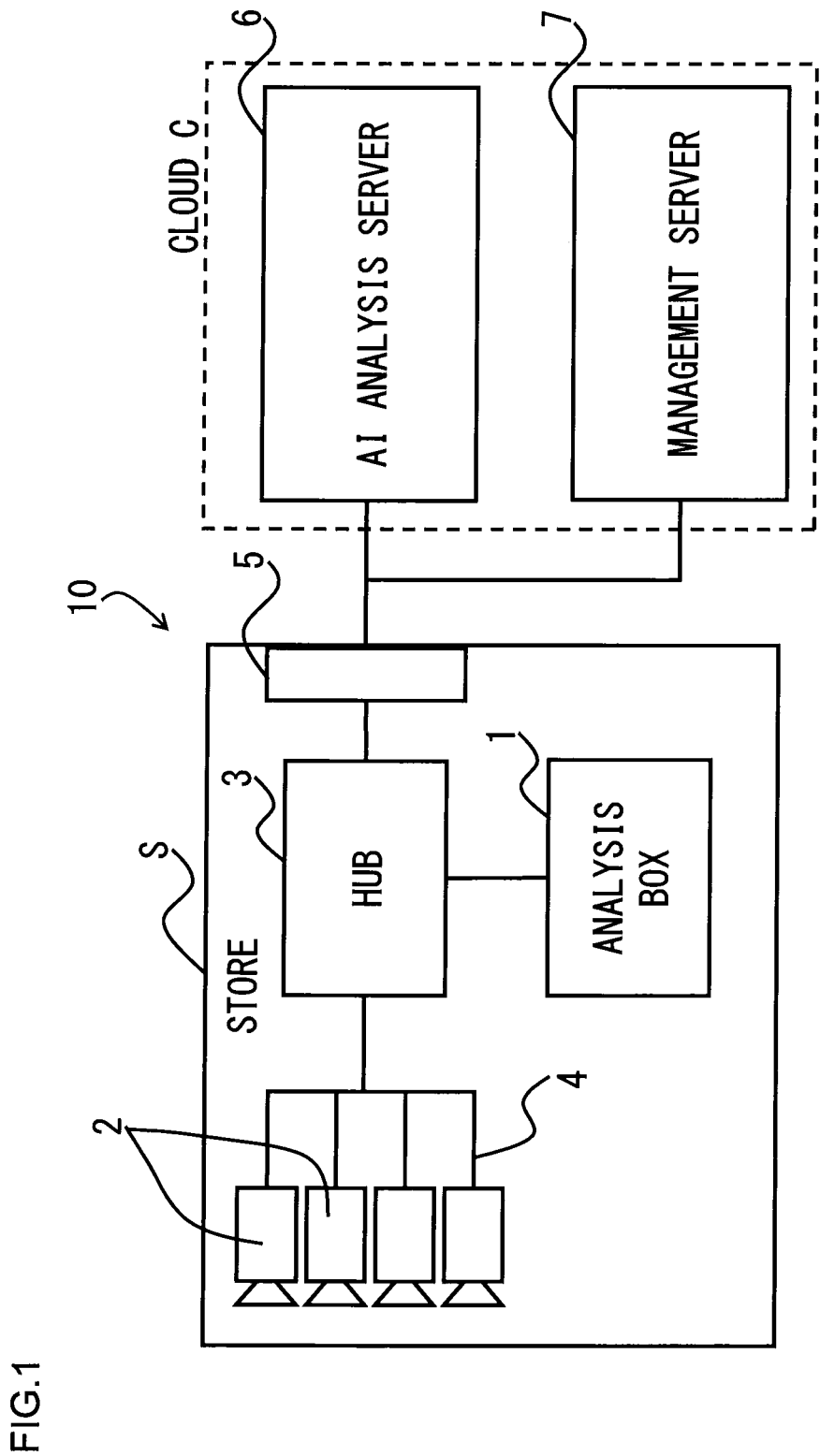
FIG. 1 is a schematic block diagram showing an outline of an image analysis system including an analysis box according to an exemplary embodiment of the present invention.

Hereinafter, an image analysis device and an image analysis system according to an exemplary embodiment of the present invention will be described with reference to the drawings. FIG. 1 is a schematic block diagram showing an outline of an image analysis system 10 including an analysis box 1 which is an image analysis device according to the exemplary embodiment of the present invention. The present embodiment describes an example in which the analysis box 1 and network cameras 2 (Internet Protocol cameras or IP cameras) connected to the analysis box 1 are placed in a store S such as a chain store. As shown in FIG. 1, the image analysis system 10 comprises the analysis box 1, a plurality of network cameras 2 (hereafter referred to simply as "cameras 2"), a hub 3 and a router 5, which are placed in the store S, and also comprises an AI (Artificial Intelligence) analysis server 6 and a management server 7 on cloud C. The set of the analysis box 1 and the plurality of cameras 2 is placed in each of a plurality of stores S, and thus actually the image analysis system 10 comprises a plurality of analysis boxes 1 and a plurality of cameras 2 which are connected to each of the plurality of analysis boxes 1.

Each of the network cameras 2 has an IP address and can be directly connected to a network. As shown in FIG. 1, the analysis box 1 is connected to each of the plurality of cameras 2 via a LAN (Local Area Network) 4 and the hub 3 to analyze input images from each of the cameras 2, and more specifically subject input images from each of the cameras 2 to an object detection process and also subject images of objects detected by the object detection process to an object recognition process. Further, as shown in FIG. 1, the analysis box 1 is connected to the AI analysis server 6 and the management server 7 on the cloud C via the hub 3 and the router 5. Based on the result of object recognition from the analysis box 1, the AI analysis server 6 analyzes, for example, the behaviors of persons in each store S, and converts, for output, the analysis result information to data which can be easily used for applications for various uses such as marketing, crime prevention and so on.

Figure 9:
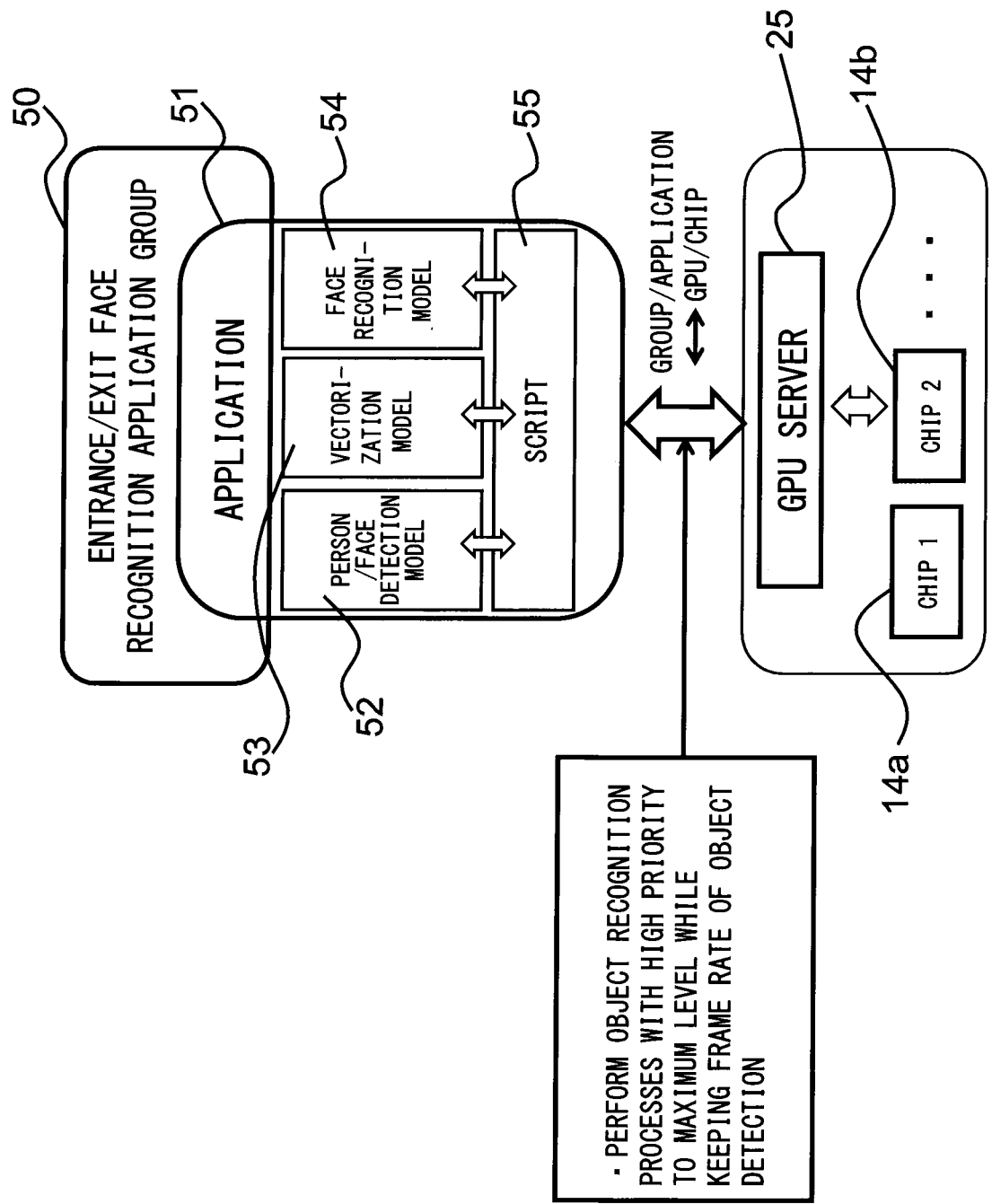
FIG. 9 is an explanatory view showing an example of the application group.

The management server 7 manages the plurality of analysis boxes 1 placed in the respective stores S and the cameras 2 connected to the analysis boxes 1. More specifically, the management server 7 installs an application package to each of the analysis boxes 1 in the respective stores S, and controls the start, stop and the like of the cameras 2 connected to these analysis boxes 1. Note that the application package corresponds to the "image analysis program" in the claims, and the application 51 in FIG. 9 is an example of the application package. As will be described in detail later, this application package is a package program including a learned neural network model for object detection, at least one kind of learned neural network model for object recognition, and a control script describing how to use these neural network models (process order).

Next, referring to FIG. 2, the hardware configuration of the analysis box 1 will be described. The analysis box 1 comprises: a CPU (Central Processing Unit) 11 configured to control the entire device and perform various operations; a hard disk 12 to store various data and programs; a RAM (Random Access Memory) 13; inference chips (hereafter referred to simply as "chips") 14a to 14h as DNN (Deep Neural Networks) inference processors; and a communication control IC (Integrated Circuit) 15. The CPU 11 is a common general-purpose CPU or a CPU designed to increase parallel processing performance to process a lot of video streams at the same time. Further, the data stored in the hard disk 12 include video data (data of frame images) obtained by decoding (data of) video streams input from each of the cameras 2, while the programs stored in the hard disk 12 include not only the application package described above, but also programs of a VMS 21, an analysis box OS 24 and a GPU server 25 which will be described in the description of FIG. 4.

The (inference) chips 14a to 14h are preferably processors optimized for DNN inference (chips dedicated for the inference), but can be general-purpose GPUs (Graphics Processing Units) used for common use, or other processors. Further, each of the chips 14a to 14h can be devices made by integrating (mounting) a plurality of chips (inference processors) on one board computer. Also, a plurality of kinds of chips can be mounted on one analysis box 1. For example, it can be arranged that four chips dedicated for inference as manufactured by Company A, eight chips dedicated for inference as manufactured by Company B and one GPU for GPGPU (General-Purpose computing on GPU) as manufactured by Company C are mounted on one analysis box 1. Note, however, that for the sake of simplification, a later description of the estimation process of a required number of chips for inference processes in each learned neural network model for object recognition and a learned neural network model for object detection will describe an example in which a plurality of chips of the same kind are mounted in one analysis box 1.

Figure 2:
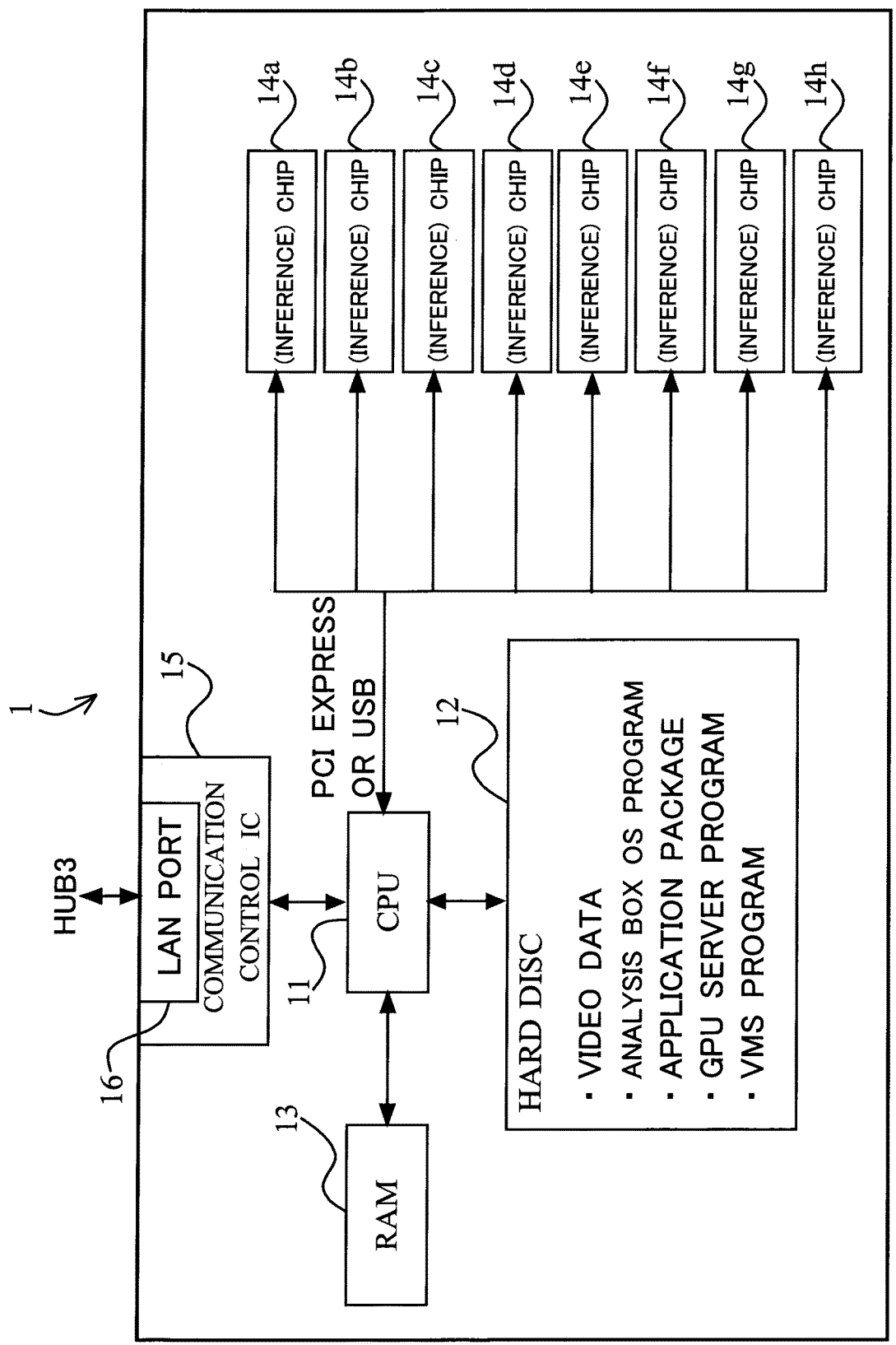
FIG. 2 is a schematic block diagram showing a hardware configuration of an outline of the analysis box.

As shown in FIG. 2, the (inference) chips 14a to 14h are connected to the CPU 11 by PCI (Peripheral Component Interconnect) Express or USB (Universal Serial Bus). Note that it can be arranged that one part of the chips 14a to 14h are connected to the CPU 11 by PCI Express while the other chips are connected to the CPU 11 by USB. Further, the communication control IC 15 has a LAN port 16 which is a port for connection to LAN based on the Ethernet Standard.

Figure 3:
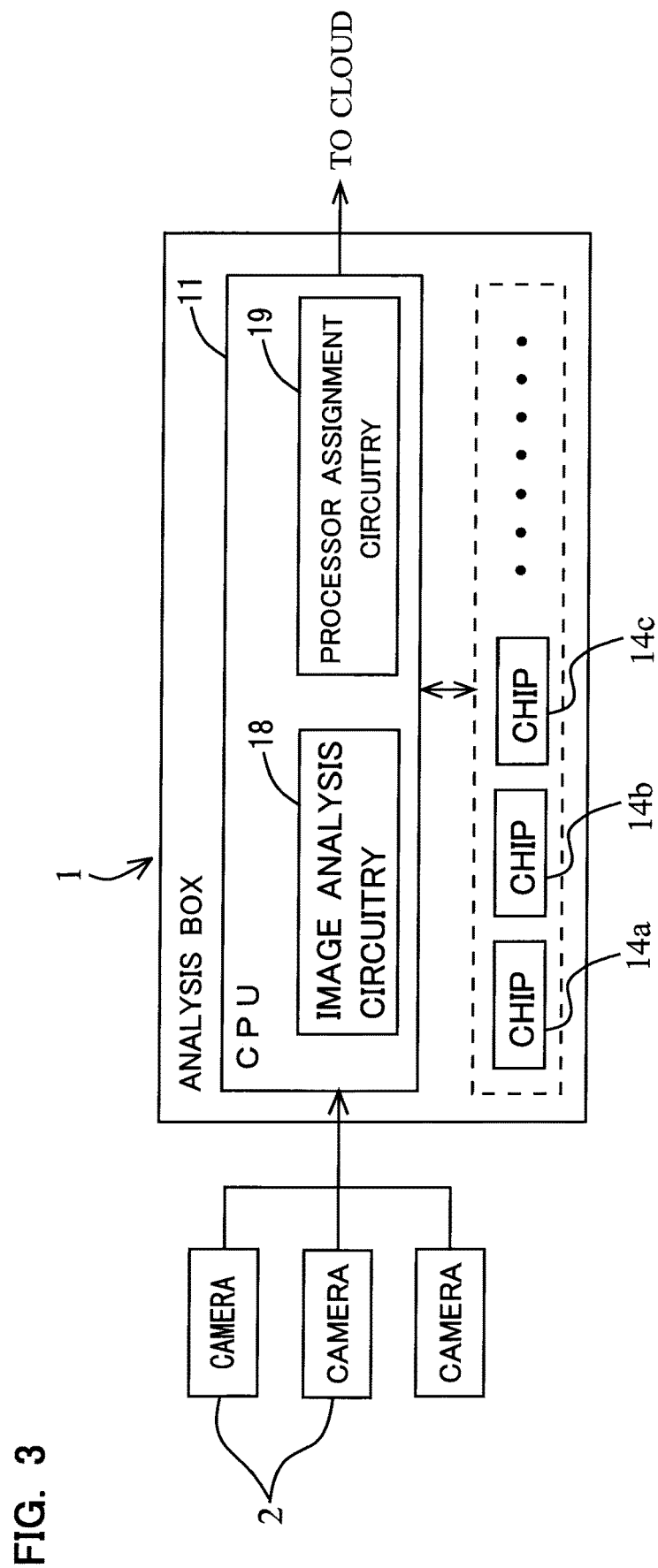
FIG. 3 is a schematic block diagram of the analysis box and cameras, showing a functional block diagram of a CPU in the analysis box.

FIG. 3 is a schematic block diagram of the analysis box 1 and the cameras 2, showing a functional block diagram of the CPU 11 in the analysis box 1. The analysis box 1 comprises an image analysis circuitry 18 and a processor assignment circuitry 19 as a functional block. The image analysis circuitry 18 analyzes images input from each of the cameras 2 by using respective instances (AI inference instances 23a to 23c shown in FIG. 4) of an application package including a learned neural network model for object detection (hereafter referred to as "object detection NN model") configured to detect objects captured in the images by each of the cameras 2, and also including at least one kind of learned neural network model for object recognition (hereafter referred to as "object recognition NN model") configured to recognize the objects detected by the object detection NN model.

Further, based on an inference time and a frequency of use required for the inference process in each of the object detection NN model and the at least one kind of object recognition NN model included in each instance of the application package, the processor assignment circuitry 19 assigns, from the plurality of chips 14a to 14h, chips (inference processors) to be used for the inference process in the object detection NN model and the inference process in each of the at least one kind of object recognition NN model. The CPU 11 of the analysis box 1 achieves the function of the image analysis circuitry 18 by performing (programs of) the AI inference instances 23a to 23c shown in FIG. 4. Further, the CPU 11 of the analysis box 1 achieves the function of the processor assignment circuitry 19 by performing (programs of) the GPU server 25 shown in FIG. 4.

Figure 4:
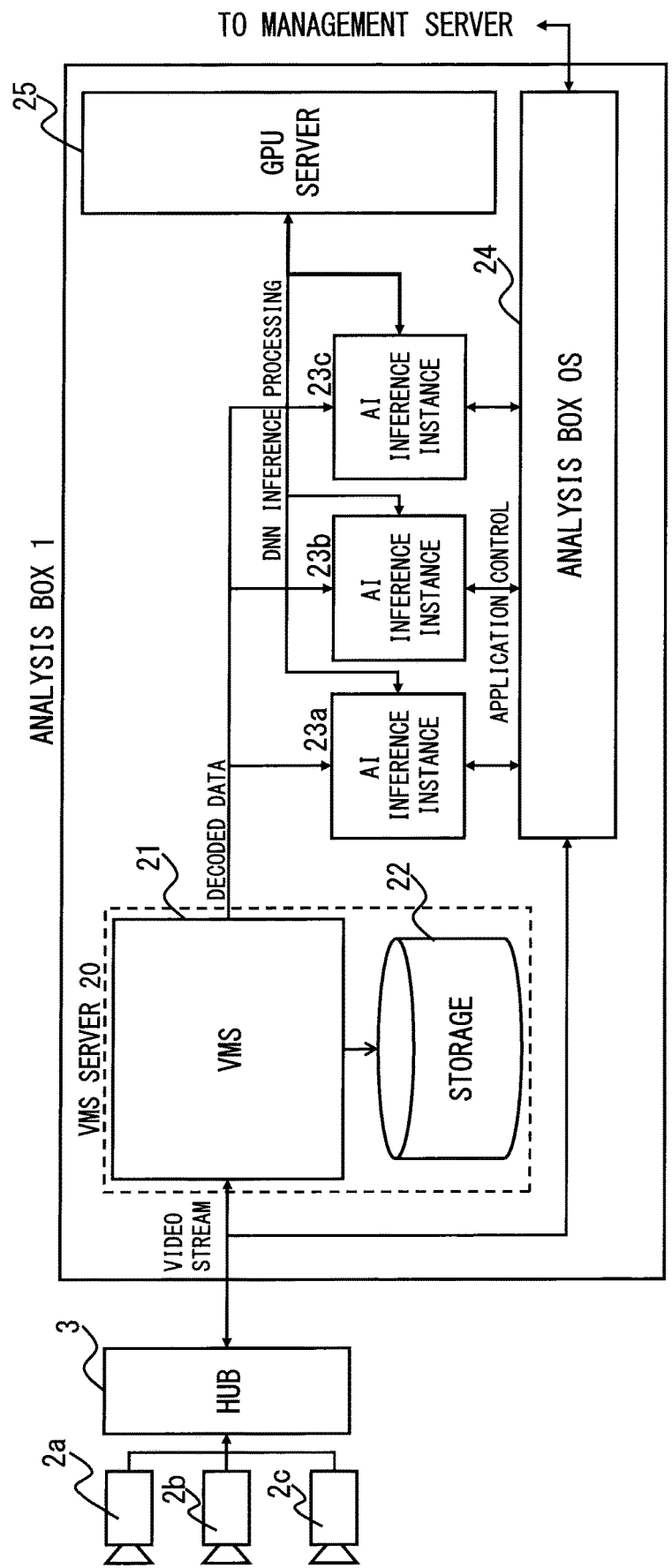
FIG. 4 is a schematic block diagram of the image analysis system showing main softwares in the analysis box.

Next, referring to FIG. 4 which is a schematic block diagram of the image analysis system 10 showing main softwares in the analysis box 1, the configuration of the main softwares in the analysis box 1 will be described. As shown in FIG. 4, the main softwares in the analysis box 1 are a VMS (Video Management System) 21, an AI inference instances 23a to 23c, an analysis box OS (Operating System) 24 and a GPU server 25. FIG. 4 shows processes of the respective softwares. The VMS 21 decodes video streams input from the cameras 2a to 2c via the hub 3, and stores the decoded (data of) frame images in a storage 22, and also outputs them to the AI inference instances 23a to 23c via a bus in the analysis box 1. The combination of the VMS 21 and the storage 22 forms a VMS server 20.

Here, each of the AI inference instances 23a to 23 is the instance of the application package described above (corresponding to the application 51 of FIG. 9). The AI inference instances 23a, 23b, 23c respectively subject the images input from the respective cameras 2a, 2b, 2c to object detection and object recognition. The reason why the AI inference instances for the object recognition process for the images input from the respective cameras 2a, 2b, 2c are thus individually provided is because there is a possibility that the kinds of (object detection NN models and object recognition NN models included in) the application packages used for the respective cameras 2a, 2b, 2c may respectively be different from each other.

The analysis box OS 24 described above controls the applications such as the AI inference instances 23a to 23c in the analysis box 1, and sends and receives data to and from the management server 7. Further, a main process performed by the GPU server 25 is a process to assign, from the plurality of chips 14a to 14h (refer to FIG. 2), chips to be used for the inference process in the object detection NN model and the inference process in the at least one object recognition NN model based on the inference time and the frequency of use required for the inference process in each of the object detection NN model and the at least one object recognition NN model included in each of the AI inference instances 23a to 23c at start-up of each of the AI inference instances 23a to 23c. Note, however, that the frequency of use of each of the object detection NN model and the at least one object recognition NN model included in each of the AI inference instances 23a to 23c may vary depending on the time of day, and therefore, the GPU server 25 can change the assignment of chips to be used for the inference process in the object detection NN model and the inference process in each object recognition NN model depending on the time of day.

Next, a basis strategy for the GPU server 25 to assign each of the object detection NN models and the object recognition NN models to the chips 14a to 14h will be described.

1. The NN model (object detection NN model or object recognition NN model) assigned to each of the chips 14a to 14h can be exchanged with the other. However, the exchange of the NN models requires (cost in terms of) time, and therefore, this exchange should be avoided as much as possible. Note that the time required for the exchange of NN models depends on the chips. Generally, there are (inference) chips to which only a single NN model can be assigned, and there are also those to which a plurality of NN models can be assigned.

2. Each NN model is assigned to each chip 14a to 14h so as to just sufficiently meet the requirements for analysis (requirements for object recognition) in the store. More specifically, the following assignments 2-1 and 2-2 are to be performed.

2-1. Assign the object detection NN model to minimum chips to enable object detection for images from all cameras at a frame rate which, with the current chip configuration (the kinds and number of chips), enables recognition of all objects to be recognized. Here, the term minimum chips refers to minimum chips in terms of number and performance.

2-2 Assign each object recognition NN model to an appropriate number of chips, depending on the inference time for object recognition (such as category recognition) (inference time required for the inference process of the object recognition NN model) and on the necessity (frequency of use and priority) of the object recognition.

2-3 Design so that a minimum exchange (replacement) of the NN models is sufficient if the conditions for the assignments 2-1 and 2-2 change from moment to moment, considering the (cost in terms of) time required for the exchange of the NN models as described in 1 above.

3. It is possible to postpone an object recognition process of not very high priority (that is, it is not required to finish it in real-time). More specifically, it is possible to perform the object recognition process in spare time based on (data of) frame images from the VMS server 20 (refer to FIG. 4).

If the assignment of chips is appropriate as a result of assigning each NN model to each chip 14a to 14h according to the basic strategy described above, the GPU server 25 shows a very simple behavior, and simply inputs the (data of) frame images obtained by decoding the video streams input from the cameras 2a to 2c to the chips assigned to the object detection NN models to detect objects to be recognized, and then transfers data of all the detected objects into the chips assigned to the object recognition NN models.

Next, an example of how the GPU server 25 assigns the NN models to the chips will be described. This example of assignment calculates about how many objects to be recognized there would be present (or detected) as a result of object detection, and also calculates about how much time it would take to apply each object recognition NN model to the objects to be recognized, and then from the results of these calculations, back-calculates the number of chips to be assigned to the each object recognition NN model. The reason for this way of assigning the chips is that, depending on the number of objects to be recognized as a result of object detection and on the kind of object recognition NN model applied to these objects to be recognized, the required number of chips for the inference process in each object recognition NN model at a constant frame rate for object detection is different.

Figure 5:
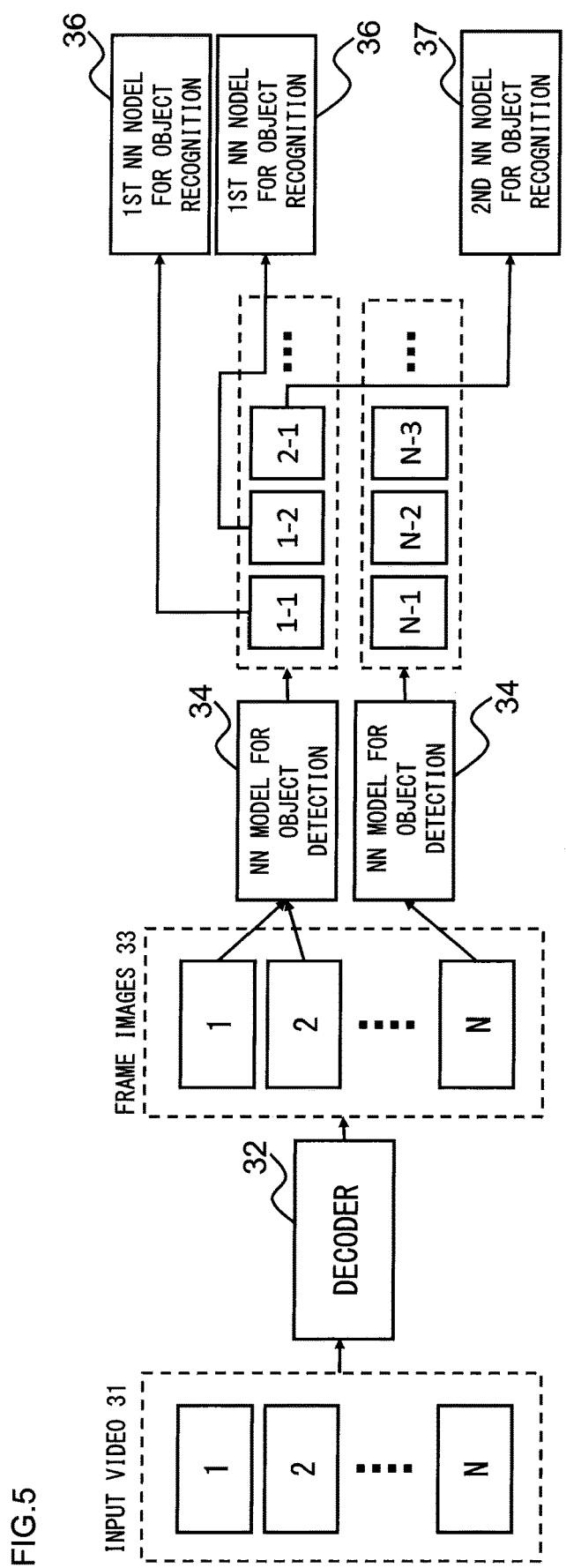
FIG. 5 is an explanatory view of a calculation method of the required number of chips for an inference process of each NN model for object recognition in the analysis box.

This will be described with reference to FIG. 5, which is an explanatory view of a calculation method of the required number of chips for an inference process of each of object recognition NN models 36, 37 in the analysis box. Referring to FIG. 5, an object detection NN model 34 is a NN model capable of detecting both a person and a face. As shown in FIG. 5, assuming that the object detection NN model 34 has detected a person 1-1 and a person 1-2 from a first frame image 33 (1) and a person 2-1 from a second frame image 33(2), these two frame images 33(1), 33(2) are subjected to object recognition in which a first object recognition NN model 36 configured to perform an object recognition process for person such as category of person is used twice, and a second object recognition NN model 37 configured to perform an object recognition process for face (such as gender and age estimation) is used once.

Here, the first object recognition NN model 36 and the second object recognition NN model 37 are different from each other in the inference time required for the inference process of object recognition, and therefore, the required numbers of chips for the respective inference processes in the first object recognition NN model 36 and the second object recognition NN model 37 vary, depending on the number of objects to be recognized as a result of the object detection and on the inference time of the object recognition NN model applied to these objects to be recognized. In other words, depending on the number of objects to be recognized as a result of the object detection and on the kind of object recognition NN model applied to these objects to be recognized, the required number of chips for the inference process in each object recognition NN model at a constant frame rate for object detection varies.

Note, however, that the number of objects to be recognized as a result of object detection in each frame image 33, and the time for performing the inference process in each object recognition NN model for these objects to be recognized vary depending on the time of day. For example, between busy time in the evening and spare time past noon, the number of objects to be recognized varies, and therefore the time required for the object recognition process for these objects to be recognized varies. Thus, anticipating this, it is required to assign each NN model (for example, the object detection NN model 34, the first object recognition NN model 36 and the second object recognition NN model 37) to each chip at start-up of the analysis box 1, so as to make it possible to respond by a minimum number of exchanges (or changes) of the NN models (or number of changes in the way of assigning the respective NN models, that is the object detection NN model and each object recognition NN model, to the respective chips).

The management server 7 described above (refer to FIG. 1) allows a manager to use simple steps (to perform input operations such as model performance, number of cameras, target performance and so on used in the process of "estimation of a required number of chips" described later) to assign, to each chip, each NN model required for the analysis (object recognition) to be performed. More specifically, when a manager inputs the model performance, the number of cameras, the target performance and so on to the management server 7, the management server 7 sends the input information to the analysis box 1. Based on the received input information, the CPU 11 of the analysis box 1 uses the GPU server 25 (refer to FIG. 4) to assign each NN model required for the analysis to each chip.

Figure 6:
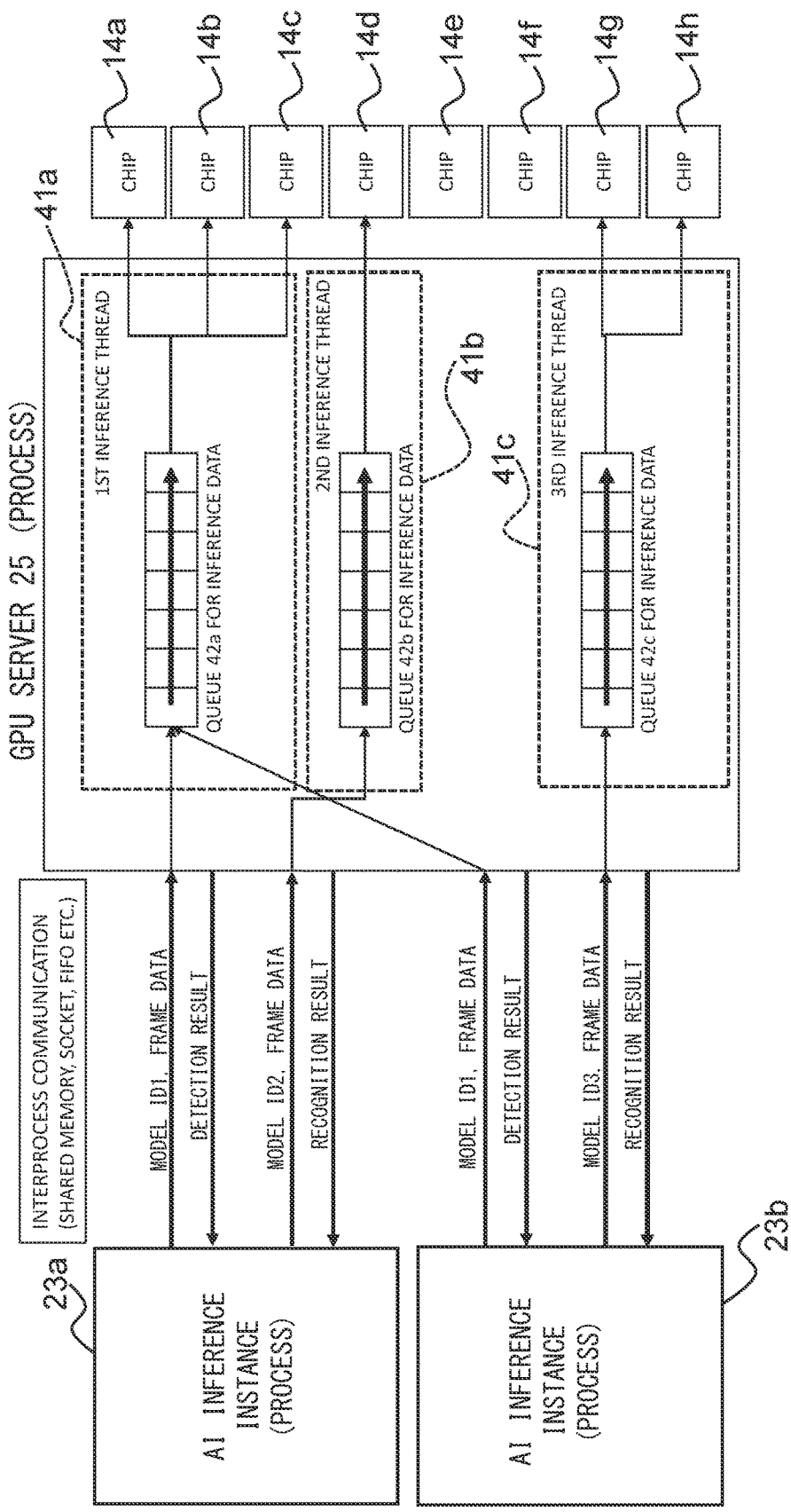
FIG. 6 is an explanatory view of communication between AI inference instances and a GPU server.

Next, an example of how the GPU server 25 described above assigns the NN model to the chip will be described in detail. However, before describing the example, the following describes communication between the AI inference instance 23 (which is a collective term for the AI inference instances 23a to 23c in FIG. 4) described above and the GPU server 25 with reference to FIG. 6. The interprocess communication between the (process of) the AI inference instance 23 and the (process of) the GPU server 25 is performed using a shared memory, a socket, a FIFO (First-In-First-Out) buffer or the like. FIG. 6 shows an example when a FIFO buffer is used, showing processes performed after each NN model has already been assigned to each chip 14a to 14h. Note that, precisely, the data sending and receiving processes in the AI inference instance 23 in the interprocess communication in FIG. 6 is performed by a script in the AI inference instance 23. This script corresponds to the script 55 in the application 51 of FIG. 9.

In FIG. 6, the AI inference instance 23a includes an object detection NN model of model ID1 (Identification 1) and an object recognition NN model of model ID2, while the AI inference instance 23b includes the object detection NN model of model ID1 and an object recognition NN model of model ID3. Here, with reference to FIG. 6, processes between each of the AI inference instances 23a, 23b and the GPU server 25, which are performed after each NN model is already assigned to each chip 14a to 14h, will be described. First, as shown in FIG. 6, when the AI inference instance 23a sends, to the GPU server 25, information indicating that the NN model to be performed is the model ID1, and frame (image) data to be used for the inference process using the NN model, the GPU server 25 inputs the received frame data to a queue 42a for inference data in a first inference thread 41a corresponding to the object detection NN model of model ID1. The queue 42a for inference data outputs the input frame data, in order of input, to the chips 14a to 14c assigned to the object detection NN model of model ID1. Then, these chips 14a to 14c for inference subject the input frame (image) data to object detection. Thereafter, the first inference thread 41a of the GPU server 25 returns the result of the object detection to the AI inference instance 23a.

The AI inference instance 23a, when receiving the result of the object detection from the first inference thread 41a, sends, to the GPU server 25, frame data of objects to be recognized (for example, person and face) based on the received result of the object detection, and the information indicating that the NN model to be performed is the model ID2. The GPU server 25 inputs the received frame data to a queue 42b for inference data in a second inference thread 41b corresponding to the object recognition NN model of model ID2. The queue 42b for inference data outputs the input frame data of the objects to be recognized, in order of input, to the chip 14d assigned to the object recognition NN model of model ID2. Then, this chip 14d for inference subjects the input frame (image) data to object recognition. Thereafter, the second inference thread 41b of the GPU server 25 returns the result of the object recognition to the AI inference instance 23a.

The process performed by the AI instance 23b is also basically the same as the process performed by the AI instance 23a, but is different in that the NN model of the object recognition process performed for the frame data of the objects to be recognized is the NN model of model ID3. Note that, as shown in FIG. 6, the threads in the GPU server 25 to perform the inference processes corresponding to the respective NN models are divided into separate threads (first inference thread 41a, second inference thread 41b and third inference thread 41c), and these inference threads 41a to 41c have respective queues 42a to 42c for inference data.

Figure 7:
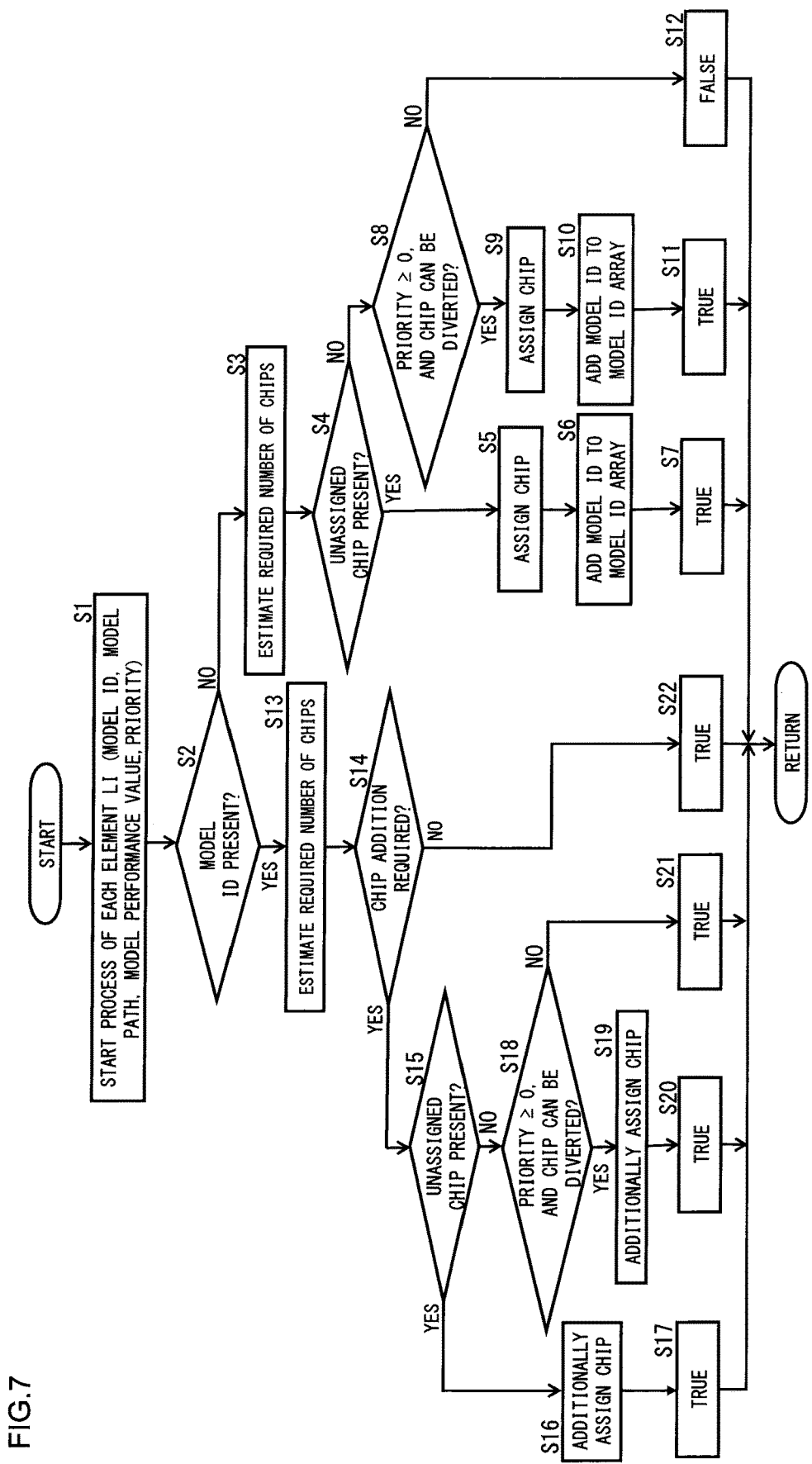
FIG. 7 is a flow chart of an assignment process performed by the GPU server to assign the NN models to the chips.

Next, referring to FIG. 7, an example of how to assign the NN models to the chips as described above with reference to FIG. 5 will be described in more detail. Note that the GPU server 25 will be described below as performing the assignment process, but more precisely, the processor assignment circuitry 19 in FIG. 3 performs the assignment process to assign the NN models to the chips. In other words, the CPU 11 cooperates with (software of) the GPU server 25 to perform the assignment process to assign the NN models to the chips. FIG. 7 is a flow chart of the assignment process performed by the GPU server 25 (more precisely, processor assignment circuitry 19) to assign the NN models to the chips. This assignment process is performed as a batch process with a timer periodically every predetermined time (for example, once every hour).

Before starting the process shown in the flow chart of FIG. 7, the GPU server 25 obtains information of model ID, model path and model performance (value) of each of all NN models included in all AI inference instances 23 that can possibly be used, and also information of input priority of each NN model itself (which is different from (calculated) priority of the each NN model to be described later) and priority of each AI inference instance 23 itself. Here, the model path means a path (representing a path to the file storage location) of a corresponding NN model in the hard disk 12 (refer to FIG. 2). The priority of each NN model included in all AI inference instances 23 is calculated from the product of the input priority of the NN model itself (which is information registered by a manager when registering the application 51 (refer to FIG. 9)) multiplied by the priority of each AI inference instance 23 itself (which is based on the criteria that the priority of a camera capturing very few persons is low, and which is the priority of the AI inference instance 23 corresponding to such camera).

Then, the CPU server 25 performs the following steps (1) to (3):

(1) Create parameter groups (of model ID, model path, model performance (value) and priority) for all the NN models included in all the AI inference instances 23 based on each of the above obtained information (information of model ID, model path, model performance (value), input priority of each NN model itself and priority of each AI inference instance 23 itself) so as to obtain a list of the parameter groups, and rearrange the list in order of the priority of each NN model to create a list L=(l1, l2, . . . , lN);

(2) Reset (release) the then assignment of the NN models to the chips; and (3) Perform the steps from step S1 onward in FIG. 7 for each element li of the above list L in order from the first (or in order of the priority of each NN model from the highest) so as to assign each NN model to each chip.

Here, if the above-described priority of each NN model is a negative value (that is, if a negative value is set for input priority of the each NN model itself), the following process allows such NN model not to be assigned to a chip. Further, if such NN model is not assigned to a chip, the inference process using such NN model is postponed using frame images stored in the VMS server 20 as described above in the paragraphs of the basic strategy. Further, the priority of the AI inference instance 23 (itself) described above is calculated from past results of amount of inference of (all NN models included in) such AI inference instance 23. For example, the priority of this AI inference instance 23 (itself) can be calculated from an accumulated value of inference time of such AI inference instance 23 during preceding one hour. It is also possible that from an accumulated value of inference time of such AI inference instance 23 during each time of the day and each day of the week in about past one month, the inference time of such AI inference instance 23 during next one hour is estimated and prioritized.

When starting the assignment process for (a NN model corresponding to) an element li in the list L described above in step (3) (YES in S1), the GPU server 25 determines whether or not chips have already been assigned to the corresponding NN model. More specifically, the GPU server 25 determines whether or not a model ID (included in the parameter group) of the element li described above is stored (present) in a model ID array managed by its own process (that is, array in the program of the GPU server 25), so as to determine whether or not chips have already been assigned to the NN model corresponding to this model ID (S2). As a result, if this model ID has not yet been stored in the model ID array (NO in S2), the GPU server 25 estimates a required number of chips for the inference process of the NN model corresponding to this model ID (S3). The estimation process of the required number of chips will be described in detail later.

Next, if it has been determined that, among the (inference) chips 14a to 14h shown in FIG. 2, there remain chips which have not yet been assigned (to the NN model) (YES in S4), the GPU server 25 selects the estimated number of chips as required in step S3 above from these unassigned chips, and assigns these selected chips to a NN model corresponding to the model ID which has been determined in step S2 above as not yet having been stored (S5). Then, the GPU server 25 adds (or stores) the model ID, which has been determined in step S2 above as not yet having been stored, to (or in) the model ID array described above (S6).

As a result of the chip assignment process of S5 above, the NN model to which the chips have been assigned in the assignment process becomes usable (that is, is brought to "True" state) in the analysis box 1 (S7). Here and in FIG. 7, "True" means a state in which at least one chip is assigned to such NN model, and such NN model is usable. In contrast, "False" means a state in which no chip is assigned to such NN model, and such NN model is not usable. In the case of "False", the inference process using such NN model is postponed as described above in the paragraphs of the basic strategy.

If it has been determined in step S4 above that no unassigned chip remains (NO in S4), the GPU server 25 determines whether or not the priority of the element li described above is 0 (zero) or higher, and at the same time, whether a chip can be diverted from another inference thread (corresponding to one of the first to third inference threads 41a to 41c of FIG. 6) (S8). If the priority of the element li is 0 or higher, and at the same time, a chip can be diverted from another inference thread (YES in S8), the GPU server 25 diverts a chip from another inference thread, and assigns the diverted chip to the NN model corresponding to the model ID which has been determined as not yet having been stored in step S2 above (S9). Then, the GPU server 25 adds, to the model ID array, the model ID which has been determined as not having been stored in step S2 above (S10). Note that the specific content of the process of diverting a chip from another inference thread as described above will be described later.

As a result of the process of diverting and assigning a chip in step S9 above, the NN model to which a chip has been assigned by this assignment process becomes usable in the analysis box 1 (that is, is brought to "True" state) (S11). Note, however, that as a result of the determination in step S8 above, if the priority of the element li described above is lower than 0 (negative), or if a chip cannot be diverted from another inference thread (NO in S8), the model ID which has been determined as not yet having been stored in step S2 above cannot be used in the analysis box 1 (that is, is brought to "False" state) (S12). Further note that if it has been determined above in step S8 that the priority of the element li is lower than 0 (negative), the GPU 25 does not attempt to divert a chip from another inference thread, but returns a value of "False" (that is, "False" state is brought about). If "False" state is brought about, it is a state in which there is already no remaining chip which has not yet been assigned, and at the same time, either the priorities of elements li following the element li described above are only negative, or a chip cannot be diverted from another inference thread (that is, the number of NN models to which chips have already been assigned is the same as the number of chips). Thus, the process of assigning chips to the respective elements in the list L is ended here.

If it has been determined in step S2 above that chips have already been assigned to the NN model corresponding to the element li described above in step S2 (that is, the model ID of the element li has already been stored in the model ID array described above) (YES in S2), the number of instances of such NN model increases, although the number of NN models assigned to the chips does not increase. Thus, the GPU server 25 performs the estimation process of the required number of chips for such NN model similarly as in step S3 above (S13).

When the estimation process of step S13 above is performed, the number of instances of such NN model increases compared with when the estimation process of the required number of chips for such NN model (that is, the estimation process in step S3) is first performed. Therefore, the number of cameras used to estimate the required number of chips for the object detection NN model and the object recognition NN model increases, and an average number of persons captured by each camera used to estimate the required number of chips for the object recognition NN model (that is, average number of objects to be recognized) also increases. Thus, considering the required number of chips obtained in the estimation process in step S13 above, the GPU server 25 determines whether or not a chip to be assigned to such NN model is required to be added (S14).

As a result of the determination in step S14, if a chip to be assigned to such NN model is required to be added (YES in S14), and if there remain chips which have not yet been assigned (to the NN model) (YES in S15), the GPU server 25 selects, from the unassigned chips, a required number of chips to be added, and additionally assigns these selected chips to the NN model which has been determined in step S14 above to require such addition (S16). As a result, a state is brought about in which at least two chips are assigned to such NN model, and therefore, such NN model is, of course, brought to "True state" described above (S17).

On the other hand, if it has been determined in step S15 above that no unassigned chip remains (NO in S15), the GPU server 25 determines whether or not the priority of the element li described above is 0 or higher, and at the same time, a chip can be diverted from another inference thread (S18). If the priority of the element li is 0 or higher, and at the same time, a chip can be diverted from another inference thread (YES in S18), the GPU server 25 diverts a chip from another inference thread, and additionally assigns the diverted chip to the NN model which has been determined in S14 above to require such addition (S19). Note that if the thread corresponding to the NN model having been determined in step S14 above to require such addition becomes a thread with the lowest recognition rate as described later unless a chip is diverted to it from another inference thread, the GPU server 25 performs the additional assignment process (or the chip diversion process from another thread) described above in step S19. However, if it does not become a thread with the lowest recognition rate even without the chip diversion from another thread, the GPU server 25 does not necessarily perform the chip diversion process from another thread.

If the additional assignment process of step S19 above is performed, a state is brought about in which at least two chips are assigned to the corresponding NN model, and therefore, such NN model is, of course, brought to "True state" described above (S20). Further, if it has been determined in step S18 above that the priority of the element li described above is lower than 0 (negative), or that a chip cannot be diverted from another inference thread (NO in S18), it is not possible to additionally assign a chip to such NN model. However, even in this case, the chip assignment to such NN model corresponding to the corresponding model ID must have already been performed as a result of the determination in step S2 above (that is, a result of the determination that "a chip has already been assigned to such model ID"), and therefore, such NN model is, of course, brought to "True" state described above (S21).

According to the above description, after the chip assignment process to the NN models with a priority of 0 or higher is all finished, a chip has been assigned even to a NN model with a negative priority, only if there remain unassigned chips (YES in S4 and YES in S15). However, it is not limited to this. For example, even if no unassigned chip remains, a chip assignment can be performed so that if there is a thread of a NN model having a performance with a margin sufficiently beyond target performance described later, a chip assigned to this NN model is diverted and assigned to a NN model with a negative priority. Also, if it has been determined in step S14 described above that a chip to be assigned to such NN model is not required to be added (NO in S14), that is, if the current number of chips to be assigned is sufficient even when the instances of such NN model increase, such NN model is, of course, brought to "True" state described above (S22).

Next, the estimation process of the required number of chips in step S3 and step S13 will be described in detail. This estimation process of the required number of chips varies in content depending on whether a target NN model is an object detection NN model or an object recognition NN model. Note, however, that regardless of whether the NN model is either of the object detection and recognition models, the GPU server 25 (processor assignment circuitry 19) estimates the required number of inference processors for the inference process of each NN model based on the inference time and the frequency of use required for the inference process of each NN model. Note that for the sake of simplification, the following description of the estimation process of the required number of chips will describe an example in which a plurality of chips of the same kind are mounted in one analysis box 1.

First, the estimation process of the required number of chips for the object detection NN model will be described. In this case, the GPU server 25 (processor assignment circuitry 19) estimates the required number of chips (required performance) for the inference process of the object detection NN model by using the following equation based on the number K of cameras to capture images to be input as targets for the object detection using the object detection NN model, and on model performance T of the object detection NN model (represented by inference time (second) required for the inference process of the object detection NN model), and also on target performance F of the object detection NN model (represented by a target number of frames (FPS (frames per second)) to be subjected to the inference process by the object detection NN model within a certain time (1 second)):

Required performance(number of chips)=$K \times F \times T$

For example, assuming the number K of cameras=3 (units), the model performance T=0.05 (second), and the target performance F=6 (FPS), the required performance (or the required number of chips for the inference process) of the object detection NN model is calculated by using the following equation:

Required performance(number of chips)=$3 \times 6 \times 0.05 = 0.9$

This means that in the case of this example, one chip is required. The target performance F described above is needed as a reference value to estimate the required number of chips. Further, this target performance F is also needed when comparing with another thread (a thread corresponding to another NN model) in terms of performance and degree of margin of resource.

Next, the estimation process of the required number of chips for the object recognition NN model will be described. In this case, the GPU server 25 (processor assignment circuitry 19) estimates a required number of chips (required performance) for the inference process of the object recognition NN model by using the following equation based on average numbers N1, N2, . . . of persons captured by respective cameras to capture images to be input as targets for the object recognition using the object recognition NN model (that is, the frequency of use of the object recognition NN model), and on model performance T of the object recognition NN model (represented by inference time (second) required for the inference process of the object recognition NN model), and also on target performance F of the object recognition NN model (represented by a target number of frames (FPS) to be subjected to the inference process by the object recognition NN model within a certain time):

Required performance(number of chips)=sum(N1,N2, . . . )$\times F \times T$ (where sum (N1, N2, . . . ) represents the sum (total) of N1, N2, . . . )

For example, assuming that: the number of cameras to capture images to be input for the object recognition NN model is 3; the average numbers of persons captured by the respective cameras are 5, 2 and 3; the model performance T=0.03 (second); and the target performance F=6 (FPS), the required performance (or the required number of chips for the inference process) of the object recognition NN model is calculated by using the following equation:

Required performance(number of chips)=$(5+2+3) \times 6 \times 0.03 = 1.8$

This means that in the case of this example, two chips are required. Similarly as in the case of the object detection NN model, the target performance F described above is needed as a reference value to estimate the required number of chips. Further, this target performance F is also needed when comparing with another thread (a thread corresponding to another NN model) in terms of performance and degree of margin of resource.

Next, the chip diversion process from another inference thread as described above in steps S8, S9, S18 and S19 will be described in more detail. Before describing specific steps of the chip diversion process, basic principles to divert a chip from another inference thread will be described. In steps S4 and S15 above, when no unassigned chip remains, and a chip is to be diverted (to a corresponding NN model), the assignment of only one chip should be changed without changing the assignment of a plurality of chips at one time. This is because if the assignment of a plurality of chips is changed at one time, the likelihood of an increase or decrease in the number of chips assigned to the object detection NN model (that is, thread) increases to some extent, and this increase or decrease in the number of chips assigned to the object detection NN model (thread) causes a significant increase or decrease in the amount of data flow (mainly frame data of objects to be recognized) into the object recognition NN model (thread) which performs the object recognition process after the object detection process, making it necessary to estimate (re-estimate) the required number of chips for (a thread of) each NN model again.

Next, specific steps of the chip diversion process from another inference thread will be described:

1. First, enumerate threads of NN models to each of which a plurality of chips are assigned;
2. If, among the threads enumerated in step 1 above, there are threads with a data loss rate of 0 (zero) as described later, enumerate such threads again. On the other hand, if, among the threads enumerated in step 1 above, there is no thread with a data loss rate of 0, first sort the threads enumerated in step 1 above by priority in ascending order. Then, if there are a plurality of threads of NN models with the same priority, further sort such threads by later-described recognition rate from the highest (that is, in descending order of the recognition rate);
3. If, in step 2 above, there are threads with a data loss rate of 0, release one chip from the highest (first) thread among the enumerated threads with a data loss rate of 0. Note that, more precisely, if there are a plurality of threads with a data loss rate of 0, it is desirable to release one chip from the thread of the NN model with the lowest priority. Further, if, in step 2 above, there is no thread with a data loss rate of 0, and the sorting is performed in descending order of the recognition rate, release one chip from the highest (first) thread; and
4. Assign the chip released in step 3 above to a thread (of a NN model) which requires a chip (that is, a thread of a NN model to which a chip has not yet been assigned, or a thread with the lowest recognition rate).

Next, the data loss rate described above will be described. This data loss rate is a ratio of data, which, without being detected or recognized, has been thrown out of the entire data flowing into each thread corresponding to each of the object detection NN model and the object recognition NN model, to such entire data. Further, the recognition rate R described above can be expressed by the following equation:

$R = Fr/Fa$ where Fa (FPS) and Fr (FPS) are target performance and actual performance, respectively, of each thread.

In this equation, the actual performance Fr represents an actual measured value of the number of data (number of frames) which have been subjected to the inference process by a corresponding thread (a thread of a corresponding NN model) within a certain time (1 second). This actual performance Fr is significant only when the above-described data loss rate>0. This is because when the data loss rate=0, the number of data (number of frames) which can be subjected to the inference by such thread within a certain time (1 second) is higher than the actual measured value (that is, the actual performance Fr). Further, the target performance Fa in the above equation is essentially the same as the target performance F of the object detection NN model and the object recognition NN model described above, and each thread corresponding to each NN model represents a target number of frames (FPS) subjected to the inference process within a certain time (1 second).

Figure 8:
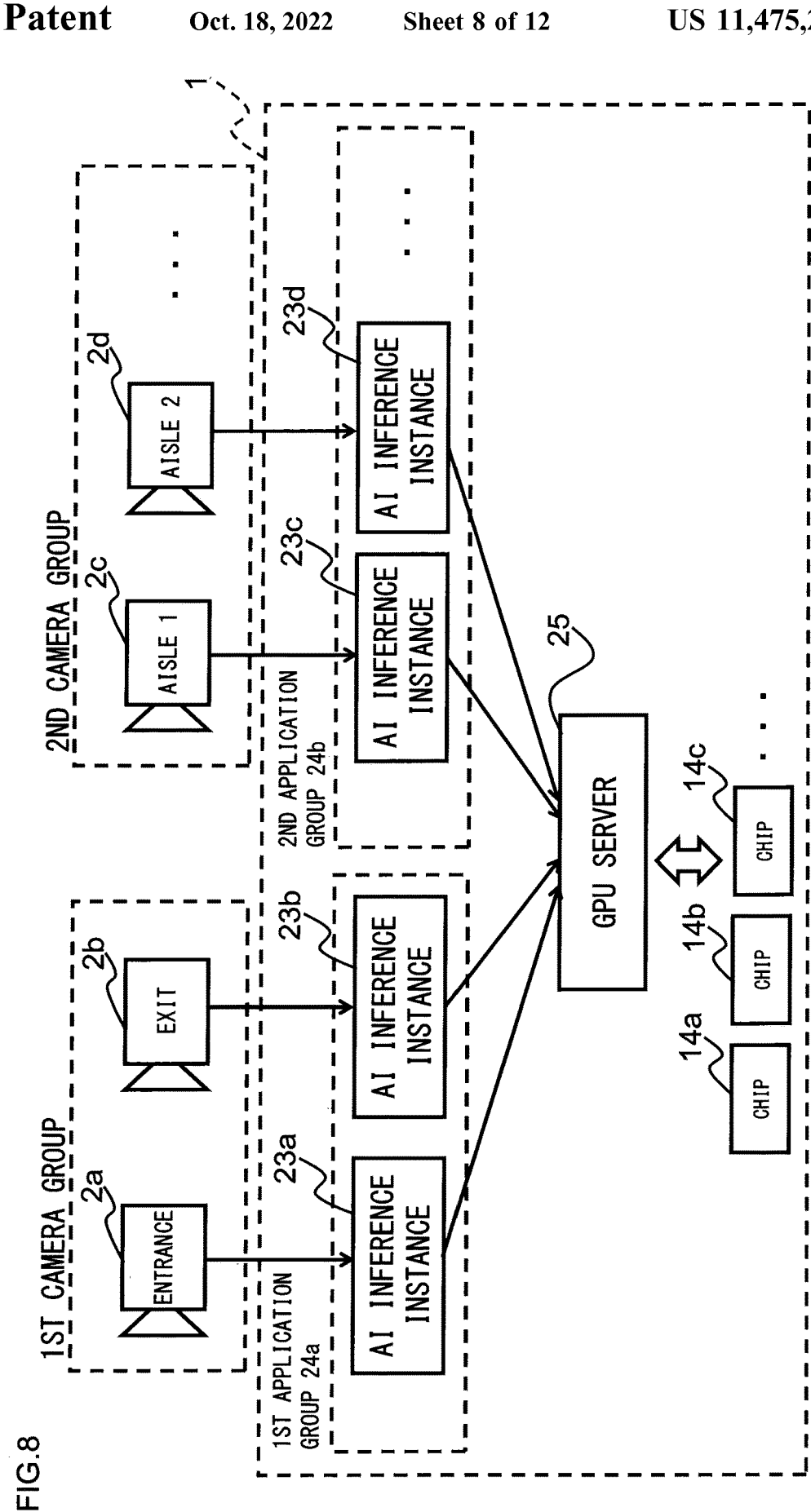
FIG. 8 is an explanatory view of camera groups and application groups in the image analysis system.

Next, referring to FIG. 8 and FIG. 9, application groups in the image analysis system 10 described above will be described. As shown in FIG. 8, which is an explanatory view of camera groups and application groups 24a, 24b in the image analysis system 10, the cameras 2 (2a to 2d and so on) connected to each analysis box 1 in the image analysis system 10 are classified into a plurality of camera groups (first camera group, second camera group and so on). Applications 51 (each of which corresponds to the "image analysis program" in the claims: refer to FIG. 9) corresponding to these camera groups, respectively, comprise, or are formed by, mutually different combinations of NN models (object detection NN model and object recognition NN model).

Each of applications groups 24a, 24b in FIG. 8 comprises instances (AI inference instances) of the same kind of the application 51. More specifically, AI inference instances 23a, 23b belonging to the first application group 24a (that is, two AI instances to process images from the camera 2a at the entrance and the camera 2b at the exit of the store both belonging to the first camera group) are instances of the same kind of the application 51, while respective AI inference instances belonging to the second application group 24b (that is, AI instances 23c, 23d and so on to process images from the cameras 2c, 2d and so on placed at respective locations in aisles in the store) are also instances of the same kind of the application 51.

FIG. 9 is an explanatory view showing an example of the application group. Like the first application group 24a in FIG. 8, an entrance/exit face recognition application group 50 in FIG. 9 is a group of the AI inference instances 23 to process images from the camera 2a at the entrance and the camera 2b at the exit of each store. The application 51 in FIG. 9 is an application program corresponding to the class of the AI inference instances 23a, 23b described above, and is a package program including a person/face detection model 52, a vectorization model 53, a face recognition model 54 and a script 55. The person/face detection model 52 is an object detection NN model configured to detect a person and a face contained in images obtained from the camera 2a at the entrance and the camera 2b at the exit of each store. The vectorization model 53 is an object recognition NN model configured to vectorize the images of the person detected by the person/face detection model 52. The face recognition model 54 is an object recognition NN model configured to estimate the gender and age of the detected person based on the face detected by the person/face detection model 52. The script 55 is a simple program for control, which describes, for example, the process steps of the person/face detection model 52, the vectorization model 53 and the face recognition model 54.

Note that registration of the input priority of each NN model itself used for the chip assignment process to each NN model as described above in FIG. 7 is performed as follows. Specifically, when a manager inputs the priority of each of the NN models 52 to 54 itself included in the application 51 (refer to FIG. 9) to the management server 7, the management server 7 registers the thus input priority of each NN model itself. This information of input priority of each NN model itself is sent to the analysis box 1 when each application is downloaded from the management server 7 to the analysis box as will be described in FIG. 11.

On the other hand, the application 51, which corresponds to the class of the AI inference instances 23c, 23d and so on of the second application group 24b in FIG. 8 (that is, AI inference instances to process images from the cameras 2c, 2d and so on placed at respective locations in the aisles in the store), is a package program including, for example: an object detection NN model configured to detect a person; an object recognition NN model configured to determine a person with a basket based on images of the person detected by the object detection NN model; an object recognition NN model configured to determine a clerk in a sales floor based on the images of the person detected by the object detection NN model; and the script 55.

The GPU server 25 (processor assignment circuitry 19) assigns the chips 14a, 14b and so on to each of the object detection NN model and the object recognition NN model by performing the process for each of the elements Li in the list L, as described above in the description of FIG. 7, so as to be able to perform the object detection and the object recognition without causing data loss (data thrown out without being recognized) as much as possible. The GPU server 25 (processor assignment circuitry 19) assigns the chips 14a, 14b and so on to each NN model so as to be able to perform object recognition processes with a high priority to a maximum level while keeping constant the frame rate of object detection (preventing the frame rate of object detection from lowering). Here, as indicated in FIG. 9, object recognition processes, which have not been performed in time for real-time processing, are performed later by the CPU 11 using frame images stored in the VMS server 20 (refer to FIG. 4). Note that the reason for keeping constant the frame rate of object detection as described above is to keep the accuracy of the process (such as analysis) by the AI analysis server 6 using the result of object recognition by the analysis box 1.

Figure 10:
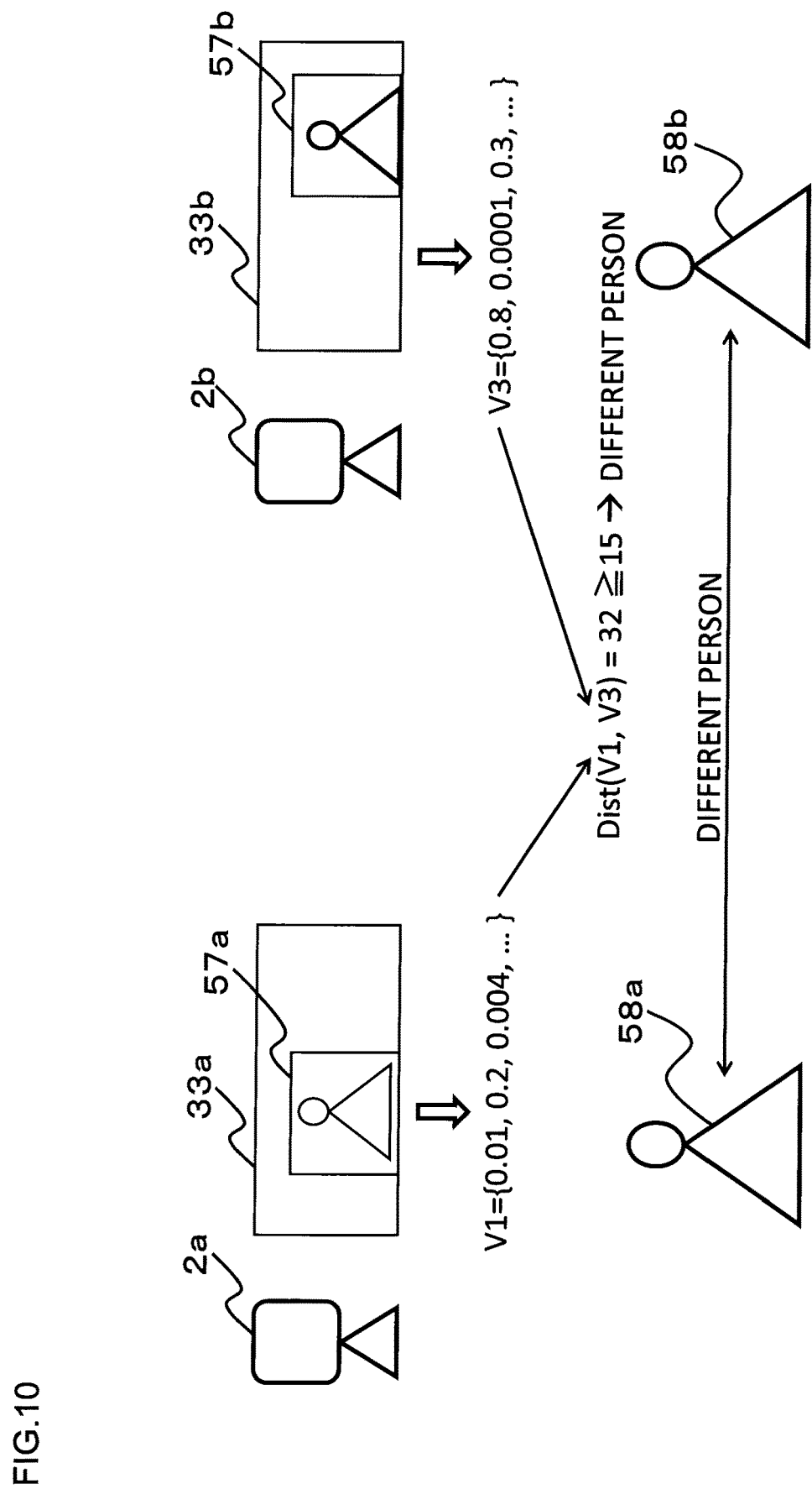
FIG. 10 is an explanatory view of a vectorization process performed by a vectorization model in FIG. 9.

Here, referring to FIG. 10, a vectorization process performed by the vectorization model 53 in FIG. 9 will be described. The image analysis circuitry 18 of the CPU 11 shown in FIG. 3 performs the following vectorization process by using the vectorization model 53 (refer to FIG. 9) included in an AI inference instance. More specifically, as indicated in FIG. 10, the image analysis circuitry 18 inputs an image 57a of a person 58a and an image 57b of a person 58b, which are detected by subjecting a frame image 33a and a frame image 33b respectively captured by the cameras 2a, 2b to the person/face detection model 52, to (a DNN model of) the vectorization model 53, whereby as indicated in FIG. 10, the vectorization model 53 converts the frame images 33a, 33b to vectors V1, V3 for output. These vectors V1, V3 are, for example, 128-dimensional vectors.

When both the vector V1 obtained from the image 57a of the person 58a detected using the frame image 33a captured by the camera 2a and the vector V3 obtained from the image 57b of the person 58b detected using the frame image 33b captured by the camera 2b are input to a Dist function, the output value of the Dist function is lower than a predetermined value (for example, 15) if the person 58a captured in the image 57a is the same as the person 58b captured in the image 57b. In contrast, in the case of the example shown in FIG. 10, the output value (32) of the Dist function is equal to or higher than the predetermined value (15), and therefore, this means that the person 58a captured in the image 57a is different from the person 58b captured in the image 57b. Here, the Dist function (Distance function) is a function to calculate a distance between input vectors. Thus, by subjecting at least one of images (for example, images 57a, 57b in FIG. 10) of a person detected in frame images captured by the respective cameras 2a, 2b to the vectorization process described above, the image analysis circuitry 18 of the CPU 11 can determine whether or not the person captured by the camera 2a is the same as the person captured by the camera 2b.

Figure 11:
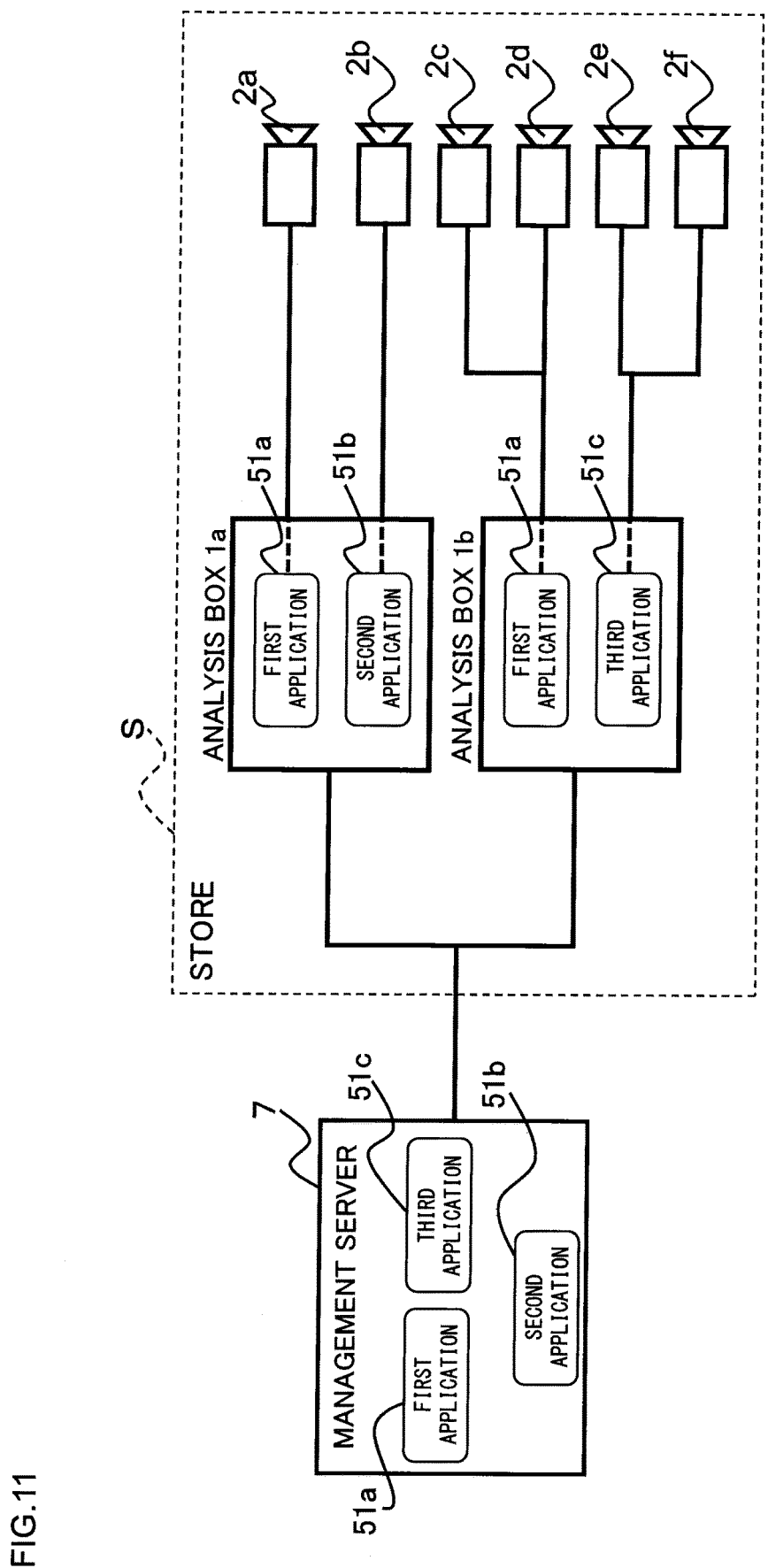
FIG. 11 is a schematic block diagram showing connections between a management server and respective analysis boxes, and connections between respective analysis boxes 1 and respective cameras in a store.

FIG. 11 is a schematic block diagram showing connections between a management server 7 and respective analysis boxes 1, and connections between respective analysis boxes 1 and respective cameras 2 in a store S. This FIG. 11 shows the connections of the management server 7 to respective analysis boxes 1a, 1b and respective cameras 2a to 2f in only one store S. In order to facilitate understanding of the correspondence relationship between respective applications 51a to 51c in the analysis boxes 1a, 1b and the respective cameras 2a to 2f, the connections between the respective applications 51a to 51c and the respective cameras 2a to 2f are shown by dashed lines and solid lines. In order to connect the management server 7 to the respective analysis boxes 1a, 1b and the respective cameras 2a to 2f, it is first necessary to register, in the management server 7, the analysis boxes 1a, 1b to be connected, and then to register the cameras 2a to 2f in the store S in either of the analysis boxes 1a, 1b. When registering the cameras 2a to 2f in the analysis boxes 1a, 1b, the CPU 11 performs an application selection process to associate each of the cameras 2a to 2f with each of the applications 51 (first application 51a, second application 51b and third application 51c) (that is, to associate each camera with each application group shown in FIG. 8 and FIG. 9), and also performs other setting processes.

At this time, if the application 51 selected for each camera 2a to 2f is an application already installed in the analysis box 1 (analysis box 1a or analysis box 1b), (the CPU 11 of) the analysis box 1 only links the corresponding camera 2 to the selected application 51. In contrast, if the selected application 51 is a new application 51 not yet having been installed in the analysis box 1, (the CPU 11 of) the analysis box 1 downloads this application 51 from the management server 7 and installs it to the analysis box 1, and then links this application 51 to the corresponding camera 2. Note that in FIG. 11, the first application 51a of the analysis box 1a is linked to the camera 2a, while the second application 51b of the analysis box 1a is linked to the camera 2b. Also, the first application 51a of the analysis box 1b is linked to the cameras 2c, 2d, while the third application 51c of the analysis box 1b is linked to the cameras 2e, 2f.

Each of the applications 51a to 51c described above corresponds to each application group in FIG. 8. Further, the cameras 2a to 2f connected to the application boxes 1a, 1b are classified into three camera groups corresponding to the respective applications 51a to 51c. More specifically, the cameras 2a to 2f shown in FIG. 11 are classified into three groups of: the cameras 2a, 2c, 2d linked to the first application 51a; the camera 2b linked to the second application 51b; and the cameras 2e, 2f linked to the third application 51c. Note that in the description of FIG. 11 above, the correspondence relationship between each camera 2a to 2f and each application 51a to 51c in one store S has been described. However, the cameras connected to all analysis boxes 1 in the image analysis system 10 are classified into a plurality of camera groups corresponding to the respective applications 51, while the applications 51 respectively corresponding to these camera groups comprise mutually different combinations of the object detection NN model and the object recognition NN model.

Figure 12:
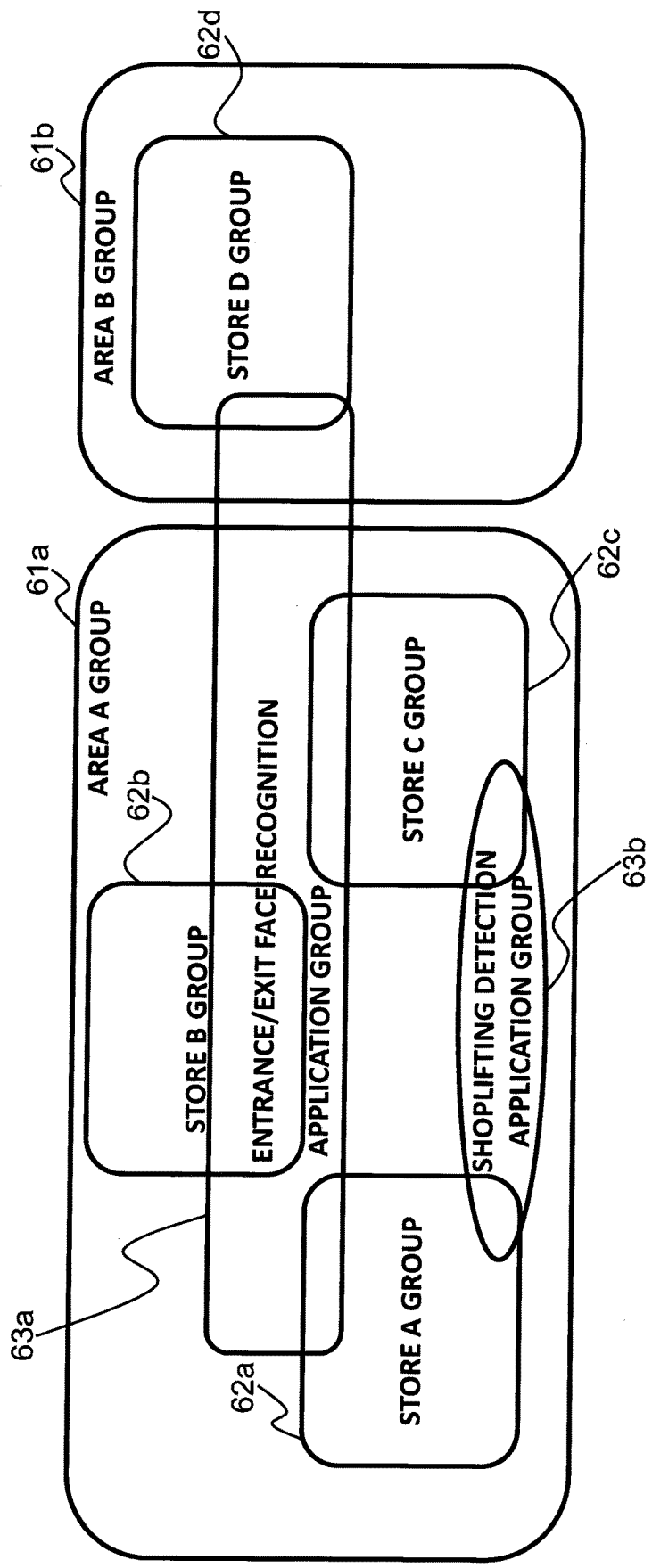
FIG. 12 is an explanatory view showing examples of units of management for the cameras connected to the respective analysis boxes in the image analysis system.

Further note that the descriptions of FIG. 8, FIG. 9, FIG. 11 and so on above have shown an example in which the management server 7 manages the cameras 2 in the image analysis system 10 per the application 51 as a unit of management, but the unit of management by the management server 7 for the cameras 2 is not limited to this. FIG. 12 is an explanatory view showing examples of units of management by the management server 7 for the cameras 2 connected to the respective analysis boxes 1 in the image analysis system 10. The management server 7 can manage the cameras 2 in the image analysis system 10 in various units (groups) such as per area (area A group 61a and area B group 61b), per store (store A group 62a to store D group 62d), per application (entrance/exit face recognition application group 63a, corresponding to the entrance/exit face recognition application group 50 in FIG. 9, and shoplifting detection application group 63b), and so on. Each of the groups in FIG. 12 corresponds to the camera group described above. In order to change the unit of management for the cameras 2a, a manager operates the management server 7 to perform a management unit switching operation on a per-group basis.

The management server 7 can manage the respective cameras 2 per group, and can also manage them individually. However, considering the efficiency of management, it is desirable to manage them per group. When the cameras 2 connected to each analysis box 1 are managed per group by the management server 7, it is possible for the management server 7, for example, to deliver an updated application 51 at a time to the respective analysis boxes 1, which manage the cameras 2 in the group, and also to command start and stop of the cameras 2 in the group at a time.

As described above, the analysis box 1 of the present exemplary embodiment is configured so that based on the inference time and the frequency of use of each of the NN models (object detection NN model and object recognition NN model) included in each of the AI inference instances 23, a chip 14 to be used for the inference process in each of the object detection NN model and the object recognition NN model (included in each AI inference instance 23) is assigned from a plurality of chips. Thus, even if the kind of object recognition for input images from one camera 2 among a plurality of cameras 2 is different from the kind of object recognition for input images from another camera, a chip 14 suitable for an inference process of each of these NN models corresponding to each of these object recognition and object detection can be assigned to the each NN model, considering the processing time (inference time) and the frequency of use of each of the NN models corresponding to the plurality of kinds of object recognitions and object detections. This makes it possible to perform efficient object recognition for input images from each of the plurality of cameras 2 by using a limited number of chips 14.

Further, the analysis box 1 of the present exemplary embodiment is configured to estimate a required number of chips 14 for the inference process of each of the object recognition NN models based on the inference time and the frequency of use required for the inference process of each of the object recognition NN models. Thus, even if the kind of object recognition for input images from one camera 2 among a plurality of cameras 2 is different from the kind of object recognition for input images from another camera, a suitable number of chips 14 for an inference process of each of these NN models corresponding to each of these object recognitions can be assigned to the each NN model, considering the processing time (inference time) and the frequency of use of each of the NN models corresponding to the plurality of kinds of object recognitions.

Further, the analysis box 1 of the present exemplary embodiment is configured to estimate a required number of chips 14 for the inference process in an object detection NN model, based on the inference time required for the inference process in the object detection NN model, and on the number of cameras 2 to capture images to be input as targets for the object detection using the object detection NN model. Here, the frequency of use of the object detection NN model varies depending on the number of cameras 2 to capture images to be input as targets for the object detection using the object detection NN model. Therefore, a suitable number of chips 14 can be assigned to the object detection NN model by estimating the required number of chips for the inference process in the object detection NN model, based on the number of cameras 2 to capture images to be input as targets for the object detection using the object detection NN model, and on the inference time required for the inference process in the object detection NN model as described above.

Further, the analysis box 1 of the present exemplary embodiment is configured to estimate a required number of chips 14 for the inference process in each of the object recognition NN models, based on the inference time required for the inference process in each of the object recognition NN models, and on the frequency of use of each of the object recognition NN models, and also on a target number of frames to be subjected to the inference process by each of the object recognition NN models within a certain time. Here, for example, by varying the target number of frames depending on the priority of the object recognition process performed by each of the object recognition NN models, it is possible to obtain an effect, in addition to the effect described above, that a suitable number of chips 14 for the inference process in each of these NN models can be assigned considering the priority of the object recognition process performed by each of the object recognition NN models.

Further, the analysis box 1 of the present exemplary embodiment is configured to estimate a required number of chips 14 for the inference process in the object detection NN model, based on the inference time required for the inference process in the object detection NN model, and on the number of cameras 2 to capture images to be input as targets for the object detection using the object detection NN model, and also on a target number of frames to be subjected to the inference process by the object detection NN model within a certain time. Here, for example, by varying the target number of frames depending on the priority of the object detection process performed by each of the object detection NN models (more specifically, the priority compared with the object recognition process performed by each of the object recognition NN models and with the object detection process performed by another kind of object detection NN model), it is possible to obtain an effect, in addition to the effect described above, that a suitable number of chips 14 for the object detection process in the object detection NN model can be assigned considering the priority of the object detection process performed by the object detection NN model.

Further, the analysis box 1 of the present exemplary embodiment is configured so that it further comprises (the storage 22 of) the VMS server 20 to store images input from each of the cameras 2, and that if at a certain time the processor assignment circuitry 19 is unable to assign a chip 14 for inference to an object detection NN model or an object recognition NN model for its inference process, and if thereafter the processor assignment circuitry 19 becomes able to assign a chip 1 to such object detection NN model or such object recognition NN model for its inference process, then the CPU 11 thereafter performs an inference process in such object detection NN model or such object recognition NN model in non-real time based on past images stored in the VMS server 20. Thus, even if at a certain time the processor assignment circuitry 19 is unable to assign a chip 14 for inference to an object detection NN model or an object recognition NN model for its inference process, the CPU 11 can perform an inference process in such object detection NN model or such object recognition NN model later as a follow-up based on past images stored in the VMS server 20

In addition, according to the image analysis system 10 of the present exemplary embodiment, it is possible to obtain an effect, in addition to the effect described above, that the management server 7 is configured and used to perform management of the cameras 2 and the analysis box 1, which includes installing the application 51 to the analysis box 1.

Modified Examples

It is to be noted that the present invention is not limited to the above-described exemplary embodiment, and various modifications are possible within the spirit and scope of the present invention. Modified examples of the present invention will be described below.

Modified Example 1

The above-described exemplary embodiment shows an example in which the processor assignment circuitry 19 (GPU server 25) estimates the required number of chips 14 (inference processors) for the inference process in each NN model (each of the object detection NN model and object recognition NN model), and assigns the estimated number of chips 14 to (the inference process of) each NN model. However, if a plurality of kinds of chips (inference processors) are mounted in one analysis box, and these chips are composed of chips with different performances, the processor assignment circuitry can be configured to determine the kinds and number of chips to be used for the inference process of each NN model, and assign the determined kinds and number of chips to each NN model, or can also be configured to determine only the kinds of chips to be used for the inference process of each NN model, and assign the determined kinds of chips to each NN model.

Modified Example 2

According to the estimation process of the required number of chips for the object detection NN model in the above-described exemplary embodiment, the processor assignment circuitry 19 (GPU server 25) is configured to estimate the required number of chips (required performance) for the inference process in the object detection NN model, based on the number K of cameras to capture images to be input as targets for the object detection using the object detection NN model, and on model performance T of the object detection NN model (represented by inference time required for the inference process of the object detection NN model), and also on target performance F of the object detection NN model (represented by a target number of frames to be subjected to the inference process by the object detection NN model within a certain time). However, it is not limited to this. For example, the processor assignment circuitry 19 can be configured to estimate a required number of chips for the inference process in the object detection NN model based only on the number K of cameras to capture images to be input and the model performance T of the object detection NN model.

Further, according to the estimation process of the required number of chips for the object recognition NN model in the above-described exemplary embodiment, the processor assignment circuitry 19 (GPU server 25) is configured to estimate the required number of chips for the inference process of the object recognition NN model based on average numbers N1, N2, . . . of persons captured by respective cameras to capture images to be input as targets for the object recognition using the object recognition NN model (that is, the frequency of use of the object recognition NN model), and on model performance T of the object recognition NN model (represented by inference time (second) required for the inference process of the object recognition NN model), and also on target performance F of the object recognition NN model (represented by a target number of frames to be subjected to the inference process by the object recognition NN model within a certain time). However, it is not limited to this. For example, the processor assignment circuitry 19 can be configured to estimate a required number of chips for the inference process in the object recognition NN model based only on the average numbers N1, N2, . . . of persons captured by the respective cameras to capture images to be input and the model performance T of the object recognition NN model.

Modified Example 3

The above-described exemplary embodiment shows an example in which the image analysis system 10 comprises the AI analysis server 6 and the management server 7 on cloud C. However, the configuration of the image analysis system is not limited to this, and it can, for example, comprise only the management server on the cloud.

These and other modifications will become obvious, evident or apparent to those ordinarily skilled in the art, who have read the description. Accordingly, the appended claims should be interpreted to cover all modifications and variations which fall within the spirit and scope of the present invention.

The invention claimed is:

1. An image analysis device which analyzes images input from a plurality of cameras, and which is separate from the plurality of cameras, comprising:
image analysis circuitry configured to analyze the images input from the plurality of cameras by using respective instances of at least one image analysis program including a learned neural network model for an object detection configured to detect objects captured in the images input from each of the plurality of cameras, and including at least one kind of learned neural network model for an object recognition configured to recognize the objects detected by the learned neural network model for the object detection;
a plurality of inference processors configured to perform inference processes in the learned neural network model for the object detection and the at least one kind of learned neural network model for the object recognition; and
processor assignment circuitry configured to assign, from the plurality of inference processors in the image analysis device, at least one inference processor to be used for the inference process in each of the learned neural network model for the object detection and the at least one kind of learned neural network model for the object recognition that are included in each of the instances of the image analysis program, based on an inference time required for the inference process in each of the learned neural network model for the object detection and the at least one kind of learned neural network model for the object recognition, and on a frequency of use of each of the learned neural network model for the object detection and the at least one kind of learned neural network model for the object recognition.

2. The image analysis device according to claim 1, wherein the processor assignment circuitry estimates a required number of at least one inference processor for the inference process in each of the at least one kind of learned neural network model for the object recognition, based on the inference time required for the inference process in each of the at least one kind of learned neural network model for the object recognition, and on the frequency of use of each of the at least one kind of learned neural network model for the object recognition.

3. The image analysis device according to claim 2, wherein the processor assignment circuitry estimates a required number of at least one inference processor for the inference process in each of the at least one kind of learned neural network model for the object recognition, based on the inference time required for the inference process in each of the at least one kind of learned neural network model for the object recognition, and on the frequency of use of each of the at least one kind of learned neural network model for the object recognition, and on a target number of frames subjected to the inference process by each of the at least one kind of learned neural network model for the object recognition within a certain time.

4. The image analysis device according to claim 1, wherein the processor assignment circuitry estimates a required number of at least one inference processor for the inference process in the learned neural network model for the object detection, based on the inference time required for the inference process in the learned neural network model for the object detection, and on a number of cameras to capture images to be input as targets for the object detection using the learned neural network model for the object detection.

5. The image analysis device according to claim 4, wherein the processor assignment circuitry estimates a required number of at least one inference processor for the inference process in the learned neural network model for the object detection, based on the inference time required for the inference process in the learned neural network model for the object detection, and on the number of cameras to capture images to be input as targets for the object detection using the learned neural network for the object detection, and on a target number of frames subjected to the inference process by the learned neural network model for the object detection within a certain time.

6. The image analysis device according to claim 1, further comprising a storage configured to store images input from the each of the plurality of cameras,
wherein if at a certain time the processor assignment circuitry is unable to assign the inference processor to the learned neural network model for the object detection or the learned neural network model for object recognition for its inference process, and if thereafter the processor assignment circuitry becomes able to assign the inference processor to such learned neural network model for the object detection or such learned neural network model for the object recognition for its inference process, then the image analysis device thereafter performs an inference process in such learned neural network model for the object detection or such learned neural network model for the object recognition in non-real time based on past images stored in the storage.

7. The image analysis device according to claim 1, wherein the plurality of cameras to be connected to the image analysis device are classified into a plurality of camera groups, the at least one image analysis program comprises a plurality of image analysis programs, and the plurality of image analysis programs respectively corresponding to the plurality of camera groups comprise mutually different combinations of the learned neural network model for the object detection and the learned neural network model for the object recognition.

8. An image analysis system, comprising:

a plurality of image analysis devices;

a plurality of cameras connected to each of the image analysis devices; and a management server configured to perform management of the cameras and the image analysis devices, which includes installing image analysis programs to the image analysis devices, wherein each of the image analysis devices is separated from the plurality of cameras, and each of the image analysis devices comprises:

image analysis circuitry configured to analyze images input from the plurality of cameras by using respective instances of the image analysis programs including a learned neural network model for an object detection configured to detect objects captured in the images input from each of the plurality of cameras, and including at least one kind of learned neural network model for an object recognition configured to recognize the objects detected by the learned neural network model for object detection;

a plurality of inference processors configured to perform inference processes in the learned neural network model for the object detection and the at least one kind of learned neural network model for the object recognition; and processor assignment circuitry configured to assign, from the plurality of inference processors in the image analysis device, at least one inference processor to be used for the inference process in each of the learned neural network model for the object detection and the at least one kind of learned neural network model for the object recognition that are included in each of the instances of the image analysis program, based on an inference time required for the inference process in each of the learned neural network model for the object detection and the at least one kind of learned neural network model for the object recognition, and on a frequency of use of each of the learned neural network model for object detection and the at least one kind of learned neural network model for object recognition.

9. The image analysis system according to claim 8, wherein the plurality of cameras connected to the image analysis devices are classified into a plurality of camera groups, and the image analysis programs respectively corresponding to the plurality of camera groups comprise mutually different combinations of the learned neural network model for the object detection and the learned neural network model for the object recognition.

* * * * *